United States Patent [19]

Etzbach et al.

[11] Patent Number: 5,212,027
[45] Date of Patent: May 18, 1993

[54] MONOMERS AND THEIR USE FOR THE PRODUCTION OF A LASER-OPTICAL RECORDING ELEMENT WHICH CAN BE REPEATEDLY ERASED AND RECORDED ON

[75] Inventors: Karl-Heinz Etzbach; Gerhard Wagenblast, both of Frankenthal; Wolfgang Brox, Heidelberg; Axel Paul, Mannheim; Volker Bach, Neustadt, all of Fed. Rep. of Germany

[73] Assignee: BASF Aktiengesellschaft, Ludwigshafen, Fed. Rep. of Germany

[21] Appl. No.: 814,517

[22] Filed: Dec. 30, 1991

Related U.S. Application Data

[62] Division of Ser. No. 524,989, May 18, 1990.

[51] Int. Cl.$^5$ .................................. G11B 7/24
[52] U.S. Cl. ...................... 430/20; 430/495; 430/945; 430/19; 428/1; 359/104
[58] Field of Search ............ 430/20, 495, 945, 19; 428/1; 359/45, 56, 104; 365/108

[56] References Cited

U.S. PATENT DOCUMENTS

| | | | |
|---|---|---|---|
| 4,293,435 | 10/1981 | Portugall et al. | 252/299.01 |
| 4,638,073 | 1/1987 | Walba et al. | 549/556 |
| 4,661,576 | 4/1987 | Decobert et al. | 526/298 |
| 4,752,820 | 6/1988 | Kuroiwa et al. | 365/108 |
| 4,753,752 | 6/1988 | Raynes et al. | 252/299.65 |
| 4,784,793 | 11/1988 | Coates et al. | 252/299.62 |
| 4,837,745 | 6/1989 | Eich et al. | 365/108 |
| 5,032,314 | 7/1991 | Ushioda et al. | 252/299.65 |
| 5,061,399 | 10/1991 | Jennes et al. | 252/299.62 |
| 5,100,579 | 3/1992 | Higuchi et al. | 252/299.65 |

FOREIGN PATENT DOCUMENTS

| | | |
|---|---|---|
| 0205187 | 12/1986 | European Pat. Off. |
| 0228703 | 7/1987 | European Pat. Off. |
| 0258898 | 3/1988 | European Pat. Off. |
| 0271900 | 6/1988 | European Pat. Off. |
| 0274128 | 7/1988 | European Pat. Off. |
| 2181263 | 4/1987 | United Kingdom. |

OTHER PUBLICATIONS

Shibaev et al., Eur. Polym. J. vol. 18 pp. 651–659, 1982.
Plate et al., J. Polymer. Sci.: Polymer Sym. 67 pp. 1–16, 1980.
Decobert et al., Polymer Bulletin 14, pp. 179–186, 1985.
Goodby et al., Mol. Cryst. Liq. Cryst. vol. 110, pp. 175–203, 1984.

(List continued on next page.)

Primary Examiner—Charles L. Bowers, Jr.
Assistant Examiner—John McPherson
Attorney, Agent, or Firm—Keil & Weinkauf

[57] ABSTRACT

Novel laser-optical recording elements which can be repeatedly erased and recorded on contain recording layers (a) which exhibit enantiotropic, ferroelectric smectic liquid crystalline ($S_{c^*}$) behavior, so that they can be switched back and forth between two thermodynamically stable, optically distinguishable ferroelectric smectic liquid crystalline $S_{c^*}$ order states on exposure to a laser beam of sufficient luminous power, by applying an external electric field. The recording layers (a) themselves consist mainly or exclusively of novel polymers P having chiral mesogenic side groups. The novel polymers P are prepared using the novel monomers of the general formula I

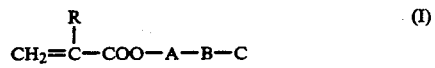

where R is hydrogen, chlorine or methyl, A is a flexible space-maintaining long-chain molecular moiety, and C is an optically active chiral molecular moiety and B is a mesogenic molecular moiety composed of at least three aromatic nuclei which are bonded linearly or virtually linearly to one another, or they are prepared using the novel monomers I which contain specially selected molecular moieties B in a novel combination with selected molecular moieties C.

40 Claims, No Drawings

OTHER PUBLICATIONS

Bone et al., Mol. Cryst. Liq. Cryst. Letters vol. 3(6) pp. 189–195, 1986.
Fu et al., J. Am. Chem. Soc., vol. 76, 6054, (1954).
Inukai et al., Mol. Cryst. Liq. Cryst., vol. 141, pp. 251–266 (1986).
Otterholm et al., Mol. Cryst. Liq. Cryst., vol. 146 pp. 189–216 (1987).
Finkelmann et al., Makromol. Chem., 179, 273–276, (1978).
Bradshaw et al., Liquid Crystals, 1987, vol. 2, No. 1, pp. 107–110.
Mosley et al., Displays, pp. 17–21, Jan. 1987.
Williams et al., J. Phys. D: Appl. Phys. 19 (1986) L37–L41.
Yoshino et al., Japanese J. of Applied Phys., vol. 26, No. 2, pp. L77–L78, Feb. 1987.
Walba et al., J. Am. Chem. Soc., 1986, 108, 5210–5221.
Byron et al., Mol. Cryst. Liq. Cryst., 1979, vol. 51 pp. 265–272.
Doering et al., J. Am. Chem. Soc., 51, 265–272 (1979).
Becker et al., Mol. Cryst. Liq. Cryst., 1986, vol. 132, pp. 167–180.
Patel et al., Ferroelectrics, 1984, vol. 59, pp. 137–144.
Patel et al., J. Appl. Phys., vol. 59, pp. 2355–2360, 1986.
Geary et al., J. Appl. Phys., vol. 62, pp. 4100–4108, 1987.

MONOMERS AND THEIR USE FOR THE PRODUCTION OF A LASER-OPTICAL RECORDING ELEMENT WHICH CAN BE REPEATEDLY ERASED AND RECORDED ON

This is a division of application Ser. No. 524,989, filed May 18, 1990.

The present invention relates to a novel laser-optical recording element which can be repeatedly erased and recorded on and which possesses a recording layer having an enantiotropic, ferroelectric smectic liquid crystalline ($S_c*$) behavior. This recording layer can be switched back and forth between two thermodynamically stable, optically distinguishable ferroelectric smectic liquid crystalline $S_c*$ order states when exposed to a laser beam of sufficient luminous power, by applying an external electric field.

The present invention furthermore relates to novel monomers I which are used for the preparation of novel polymers possessing chiral mesogenic side groups having ferroelectric smectic liquid crystalline ($S_c*$) behavior.

The present invention also relates to the use of these novel polymers for the production of the recording layers (a) of the novel laser-optical recording elements which can be repeatedly erased and recorded on.

The present invention also relates to a novel method for repeatedly recording, reading and erasing data, in which the novel laser-optical recording element which can be repeatedly erased and recorded on is used.

Mesogenic compounds, i.e. compounds which show liquid crystalline behavior, can form liquid crystalline phases. These are optically anisotropic liquids which, in contrast to normal liquids, have long-range ordering of their molecules. Melting of a solid mesogenic compound therefore initially results in the formation of a liquid crystalline phase, e.g. a smectic phase, which, when the temperature is further increased at a certain phase-transition temperature, is transformed either into a further liquid crystalline phase, e.g. a nematic phase, or into the optically isotropic melt. If the latter is again cooled, the liquid crystalline phases and finally the crystalline state are formed again at the corresponding transformation temperatures. In polymers having mesogenic side groups, i.e. groups derived from mesogenic compounds, it is however possible to freeze the liquid crystalline state by cooling once it has been produced, if the liquid crystalline polymer melt is cooled below a certain temperature, for example the glass transition temperature $T_g$ of the polymer, to give an optically anisotropic solid, which however, is not crystalline but glassy.

Liquid crystalline phases can be readily detected in the melt or in the frozen state on the basis of their optical anisotropy. For example, they exhibit birefringent textures under the polarization microscope using crossed polarizers, whereas isotropic melts appear dark here.

Layers which contain mesogenic compounds can therefore be used for information recording, while producing in such layers, by local heating, regions having altered optical properties. These regions can be detected, i.e. read, after cooling, provided that they are then stable.

Liquid crystalline phases can be divided roughly into nematic, smectic and cholesteric phases. In a nematic liquid crystalline phase, the centers of the molecules are irregularly distributed but there is a preferred direction in which the longitudinal axes of the molecules of the mesogenic compounds are aligned. Closely related to the nematic phase is the cholesteric liquid crystalline phase. In this phase, the mesogenic compounds are arranged in microlayers, the longitudinal axes of the molecules being aligned uniformly in a certain preferred direction in an individual microlayer. However, the preferred direction of orientation changes constantly in one direction of rotation from one microlayer to the next, so that in general a screw-like, helical structure of the cholesteric liquid crystalline phase results. Owing to the intermolecular interactions, in the smectic liquid crystalline phase the mesogenic compounds are in general aligned parallel and combine to form microlayers, which are stacked one on top of the other at equal distances.

In general, a smectic liquid crystalline phase or the smectic liquid crystalline behavior is denoted by S and a cholesteric liquid crystalline phase or the cholesteric liquid crystalline behavior is denoted by N*. If the mesogenic compounds contain a chiral, i.e. optically active, center which permits the formation of optically active liquid crystalline phases, this is denoted here, and in general, by * at the relevant designation or at the relevant optically active center at the chiral mesogenic compound.

Recently, ferroelectric smectic liquid crystalline phases have become particularly important in practice. In the absence of an external electric field, these phases exhibit spontaneous electric polarization, which can be reoriented by applying an external electric field; it is for this reason that these phases have logically been referred to as ferroelectric.

A typical example of such ferroelectric smectic liquid crystalline phases is the $S_c*$ phase. It has the microlayer structure typical of smectic liquid crystalline phases and, in the individual microlayers, the longitudinal axes of the molecules of the chiral mesogenic compounds have an angle of tilt $\Theta$ of $+\alpha$ or $-\alpha$ relative to the layer normal Z. The direction of inclination or of tilt of the longitudinal axes of the molecules in a microlayer relative to the layer normal Z is designated by the director n. In general, the alignment of the individual lateral dipoles of the chiral mesogenic compounds should lead to a macroscopic dipole moment. However, the director n in the $S_c*$ phase, where the latter is not spatially limited, generally executes a precession movement about the normal Z on passing through the individual microlayer planes, i.e. the polarization vector P, which indicates the direction of the total dipole moment of the phase, describes a helix through the $S_c*$ phase, resulting in a total dipole moment of 0.

If, however, such a ferroelectric smectic liquid crystalline $S_c*$ phase is limited in its thickness and is either heated in an external electric field of suitable sign and of suitable orientation or exposed to a very strong external electric field of suitable sign and of suitable orientation, the direction of polarization in the $S_c*$ phase may be reoriented when a threshold energy, dependent on the particular chiral mesogenic compound used, is exceeded, so that its polarization vector P once again corresponds to the external electric field. This reorientation of polarization is based on the tilting of the longitudinal axes of the molecules of the chiral mesogenic compounds from the angle of tilt $\Theta$ of $+\alpha$ to the angle of tilt $\Theta$ of $-\alpha$, or vice versa. A new ferroelectric smectic liquid crystalline $S_c*$ order state consequently forms in the phase, the said state being capable of being distinguished optically from the first state. If these two optically distinguishable, ferroelectric smectic liquid crystalline $S_{c^*}$ order states are thermodynamically stable, the behavior is referred to as enantiotropic, ferroelectric smectic liquid crystalline $S_{c^*}$ behavior. Since the tilting of the longitudinal axes of the molecules of the chiral mesogenic molecules takes place here along a conical path, the interchange between these two $S_{c^*}$ order states occurs very rapidly, and it is for this reason that the switching time $\tau$ for switching the $S_{c^*}$ phase back and forth between these two $S_{c^*}$ order states is extremely short.

It is known that this behavior is particularly pronounced when the chiral mesogenic compounds are present in a layer whose thickness d is smaller than the pitch G of the helix along which the director n executes its precession movement through the $S_{c^*}$ phase. In such a macroscopic layer, the helix described by the precession movement of the director n is spontaneously wound up so that the chiral mesogenic molecules have only two remaining possibilities for orienting themselves.

It is known that these macroscopic layers which exhibit enantiotropic, ferroelectric smectic liquid crystalline ($S_{c^*}$) behavior can be used as recording layers in laser-optical recording elements which can be repeatedly erased and recorded on.

For example, GB-A-2 181 263 discloses a laser-optical recording element whose ferroelectric smectic liquid crystalline ($S_{c^*}$) recording layer is no thicker than 3.5 μm, in particular 2.5 μm, and is enclosed between a front sheet and a back sheet. The front sheet is optically transparent and carries, on that side of it which faces the recording layer, a transparent electrode layer. The back sheet is electrically conductive and is not optically transparent. On its side facing the recording layer, it has a photoconductive layer whose conductivity in the dark through its layer diameter corresponds to that of the recording layer. This photoconductive layer may have an electrode layer underneath, or the back sheet may itself be electrically conductive. The surfaces directly adjacent to the recording layer are such that they effect homeotropic orientation of the chiral mesogenic compounds in the recording layer. By incorporating the photoconductive layer, on the one hand the absorption of the laser light incident through the optically transparent front sheet and conversion of this light into heat energy are improved, while on the other hand the photoconductive layer becomes electrically conductive in the exposed areas, with the result that the electric field present between the two sheets is reinforced locally in these areas to such an extent that the threshold energy for the transition between the two thermodynamically stable (enantiotropic), optically distinguishable, ferroelectric smectic liquid crystalline $S_{c^*}$ order states of the recording layer is exceeded. However, GB-A-21 81 263 does not state which chiral mesogenic compounds are to be used.

U.S. Pat. No. 4,752,820 discloses a laser-optical recording element of similar structure. Its recording layer essentially consists of low molecular weight chiral mesogenic compounds having ferroelectric smectic liquid crystalline ($S_{c^*}$) behavior and containing dichroic dyes which improve the absorption of the incident laser light by the recording layer. Such a laser-optical recording element is also disclosed in EP-A-0 205 187.

In addition, GB-A-2 181 263, U.S. Pat. No. 4,752,820 and EP-A-0 205 187 disclose the basic principles of methods for repeated recording, reading and erasing of data, which are carried out with the aid of ferroelectric smectic liquid crystalline ($S_{c^*}$) recording layers.

The disadvantage of the conventional laser-optical recording elements which can be repeatedly erased and recorded on, and of the processes carried out with the said elements, is the instability of their recording layer, containing low molecular weight chiral mesogenic compounds, to centrifugal forces as usually occur during rapid rotation of laser-optical disks. This instability may result in the order in the recording layer containing recorded data being destroyed when the laser-optical disk is rotated too rapidly, which of course leads to the loss of data and/or to incorrect information. To prevent this, it is necessary either to take additional measures for stabilizing the recording layer, or the relevant known laser-optical disks can only be recorded on, read and if necessary erased again at low rotation speeds. However, this is particularly disadvantageous in practice, where rapid processing of data and fast access to data are especially important. Moreover, the use of low molecular weight chiral mesogenic compounds has the disadvantages of a substantial lack of freezability of the order state of the thermally altered regions and diffusion between the thermally altered and unaltered regions, both of which contribute to the comparatively rapid loss of data.

Chiral mesogenic monomers having ferroelectric smectic liquid crystalline ($S_{c^*}$) behavior and polymers prepared therefrom and containing chiral mesogenic side groups, which also exhibit ferroelectric smectic liquid crystalline ($S_{c^*}$) behavior, are also known.

EP-A-0 184 482 discloses chiral mesogenic monomers which have ferroelectric smectic liquid crystalline ($S_{c^*}$) properties and are of the general formula XVI

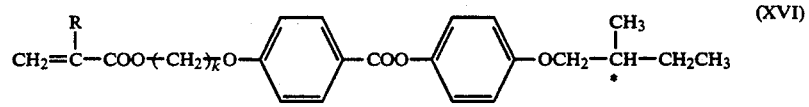

where R is methyl, chlorine or hydrogen and k is an integer of from 2 to 11.

The polyacrylates, polymethacrylates and poly-α-chloroacrylates which can be prepared therefrom are listed on page 9, line 7, to page 10, line 19, of EP-A-0 184 482.

Copolymers of the abovementioned monomers with comonomers which have nematic liquid crystalline properties, such as

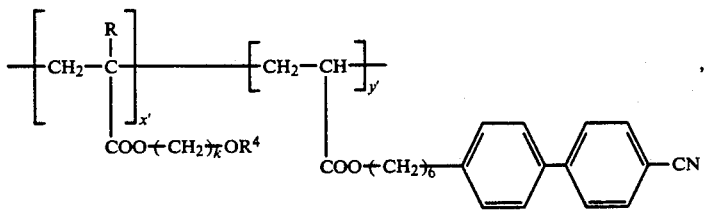

where $R^4$ is the group

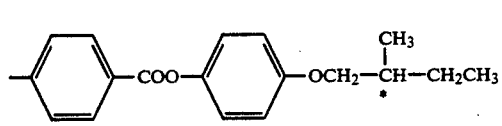

and k is an integer of from 2 to 11 and the sum of the indices $x'$ and $y'$ is 1, are also described.

Copolymers of the abovementioned monomers with one another are also described.

The following are characterized in detail: polymers where R is methyl and k is 2 or 11; polymers where R is hydrogen and k is 2 or 11; polymers where R is chlorine and k is 6; copolymers where R is methyl, k is 11, $R^4$ has the above-mentioned meaning and the indices $x'$ and $y'$ are each 0.5 or $x'$ is 0.05 and $y'$ is 0.95; and methacrylate/acrylate copolymers having the composition

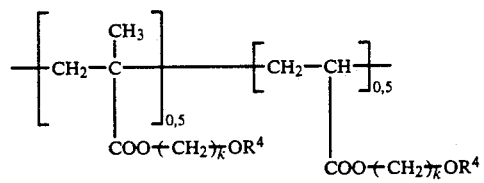

where $R^4$ has the abovementioned meaning.

Regarding the intended use of these polymers, all that need be stated is that they can be used for display purposes or for purposes of data storage. No details are given as to how this is to be carried out.

EP-A-0 228 703 discloses chiral mesogenic monomers having ferroelectric smectic liquid crystalline ($S_{c^*}$) behavior and polymers prepared therefrom which accordingly have chiral mesogenic side groups exhibiting ferroelectric smectic liquid crystalline ($S_{c^*}$) behavior.

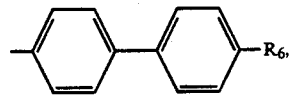

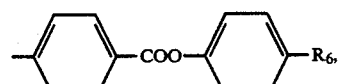

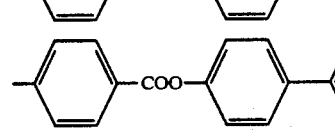

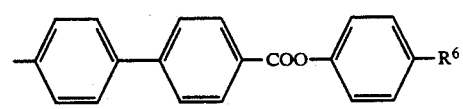

where $R^6$ is

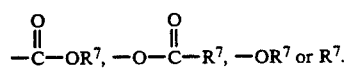

$R^7$ itself is a group of the general formula XVIII

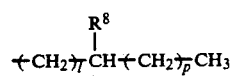
(XVIII)

where $R^8$ is methyl or chlorine, l and p are each 0 or an integer from 1 to 10 and p may not be 0 when $R^8$ is methyl.

According to the Examples, the following specific polymers were prepared from the acrylates to be used in each case and were characterized:

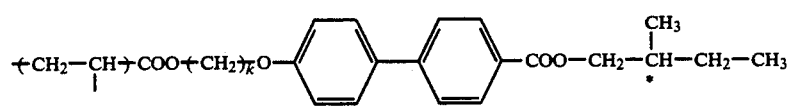

These polymers contain in their polymer main chain the repeating units of the generally formula XVII

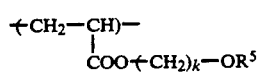
(XVII)

Here, k is an integer from 1 to 30. $R^5$ is one of the groups where k is 2, 6, 10, 12, 14, 16 and 20;

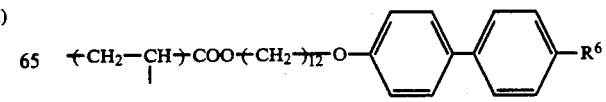

where $R^6$ is a group

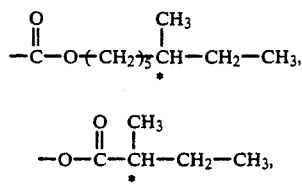

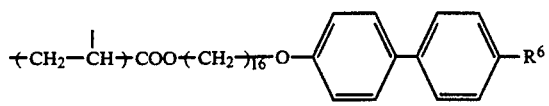

where R[6] is the groups

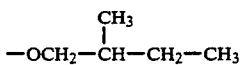

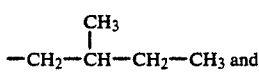 and

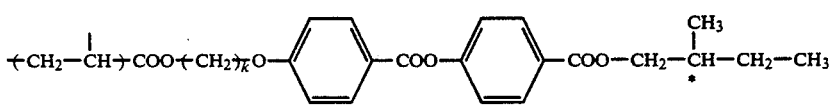

where k is 12, 14, or 16;

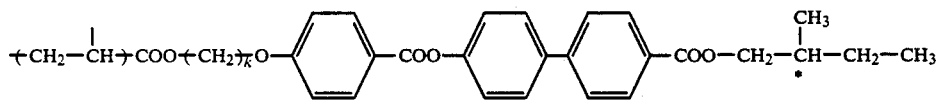

where k is 6, 10, 12, 14, 15 or 16;

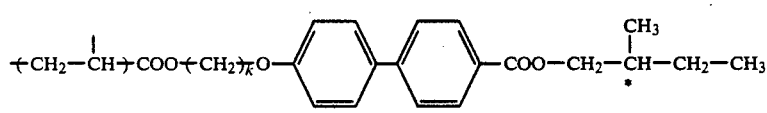

where k is 12 or 16;

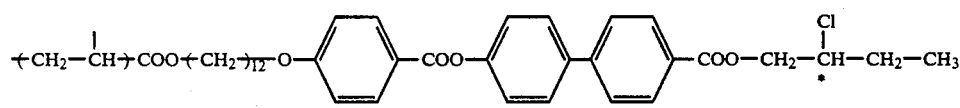

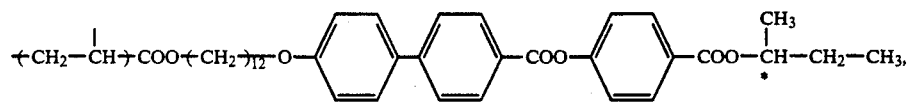

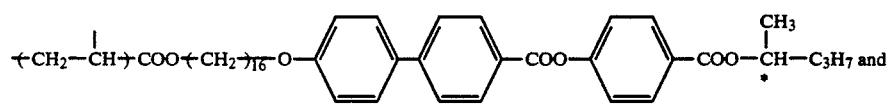

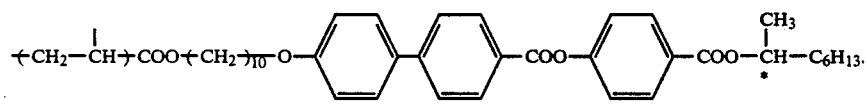

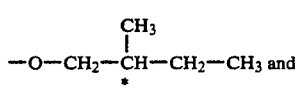 and

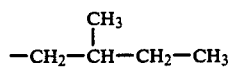

It is also stated that these polymers can be used in the areas of integrated optics, optoelectronics and data storage, use in optoelectronic apparatuses, such as displays, optoelectronic shutters, optoelectronic switches in optical communication systems, optoelectronic diaphragms, memory elements, optical modulators, printer heads and multifocal lenses, being mentioned cursorily by way of example. On the other hand, no details are given as to how data storage is to be carried out.

EP-A-0 258 898 discloses polycondensates of the general formula XIX

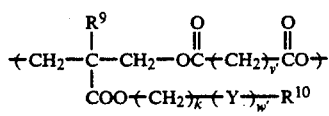

where $R^9$ is hydrogen, methyl or ethyl, $v'$ is an integer of from 1 to 20, k is an integer of from 1 to 30, the divalent group Y is an ether or carboxyl group —(—COO—)—, $w'$ is 0 or 1 and $R^{10}$ is

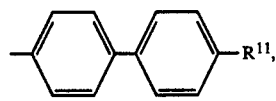

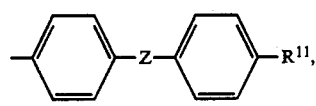

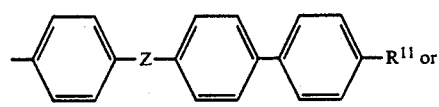

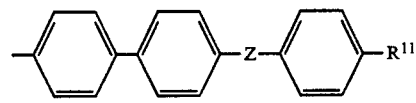

In the radicals $R^{10}$, the divalent group Z is a carboxyl group

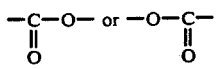

and $R^{11}$ is —COOC, —OC, —COC or —C.

The variables or groups C themselves are of the general formula VI

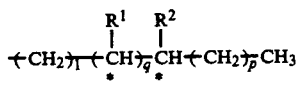

where $R^2$ is methyl, cyano or halogen, the indices l and p independently of one another are each an integer of from 0 to 10, with the proviso that the index may not be 0 if the radical $R^2$ is methyl; and q is 0 or 1 and $R^1$ is halogen.

However, these polycondensates are not polymers which were prepared by thermally initiated free radical polymerization but are polyesters which were obtained by the conventional and known polycondensation methods.

Specifically, the polyesters prepared and characterized were those which have the following side groups exhibiting ferroelectric smectic liquid crystalline ($S_c*$) behavior:

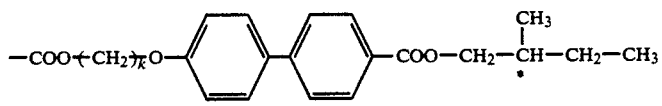

where k is 10 or 12;

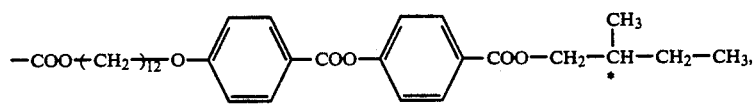

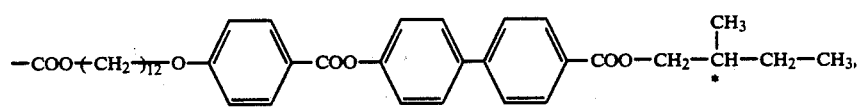

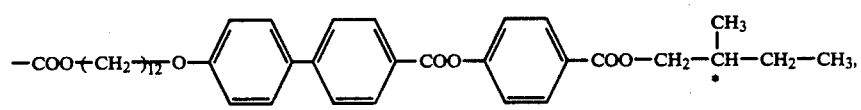

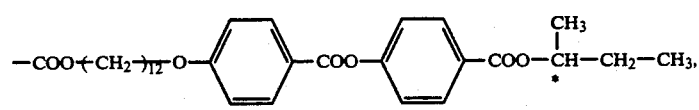

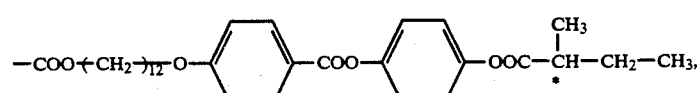

-continued

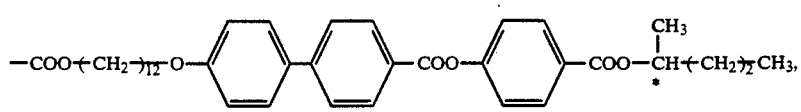

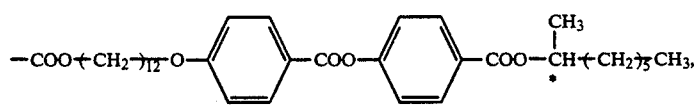

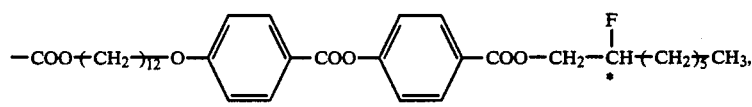

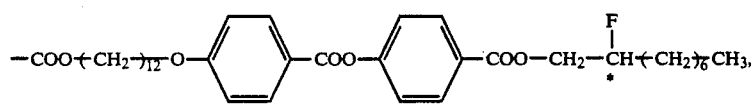

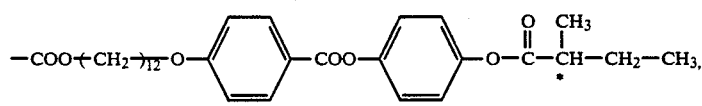

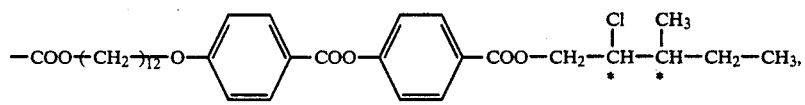

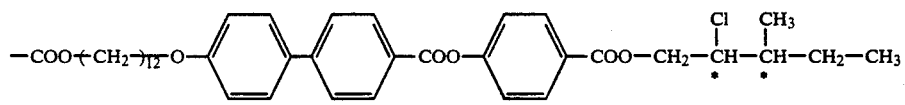

and

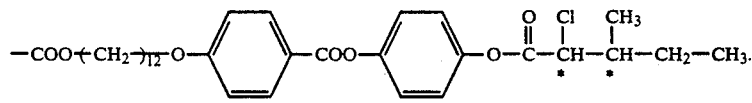

The polymers are proposed for the same intended uses as states in EP-A-0 228 703, the intended uses being mentioned only cursorily in this case too.

DE-A-36 03 267 (EP-A-0 231 858) and DE-A-36 03 268 (EP-A-0 231 857) describe apparatuses, i.e. laser-optical recording elements, and methods for reversible optical data storage, i.e. for repeated recording, reading and erasing of data. In these methods, apparatuses are used which comprise recording layers having a thickness of from $10^{-6}$ to $10^{-3}$ m and consisting of polymers containing smectic side groups, i.e. side groups exhibiting smectic liquid crystalline behavior. The Laid-open Applications furthermore state that it is also possible to use for this purpose, inter alia, polymers which are prepared from the monomers of the general formula XX.

possessed by the polymers XX is not at all clear since, instead of stating specific properties, the Laid-open Applications refer to the article by V. P. Shibaev et al. in European Polymer Journal, 18 (1982), 651 et seq. and to the article by N. A. Plate et al. in Journal of Polymer Science, Polymer Symposia (IUPAC 1978) 67 (1980), 1 et seq., which, however, disclose neither the monomers XX nor the polymers XX. Thus, DE-A-36 03 267 and DE-A-36 03 268 give no indication at all as to how a reversible laser-optical recording element is to be designed so that it has very short switching times, and as to which monomers and polymers are suitable at all for this purpose.

EP-A-0 271 900 discloses a laser-optical recording element which can be repeatedly erased and recorded on and whose recording layer exhibiting enantiotropic,

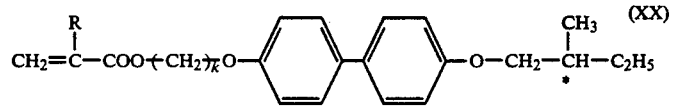

In this formula, R is methyl or hydrogen and k is an integer of from 1 to 14. However, the property profile ferroelectric smectic liquid crystalline ($S_c*$) behavior is about 3 μm thick and consists of the known polymer

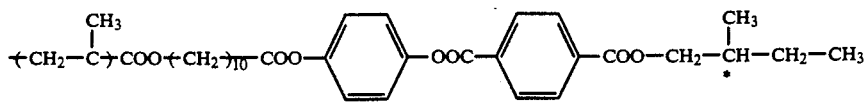

having a glass transition temperature $T_G$ of 30° C.

Further ferroelectric liquid crystalline polyacrylates are described in DE-A-38 23 153 and DE-A-38 23 154.

Furthermore, EP-A-0 274 128 discloses polyethers of the general formula XXI

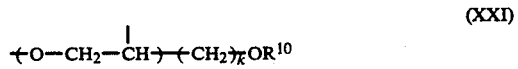

(XXI)

where $R^{10}$ has the meanings stated for the general formula XIX. The polyethers should be suitable for the reproduction of films, even on large or curved screens (displays).

The polymers known to date and having chiral mesogenic side groups which exhibit ferroelectric smectic liquid crystalline ($S_{c^*}$) behavior still, however, have a property profile which makes it more difficult, or even impossible, to use them in recording layers of laser-optical recording elements which can be repeatedly erased and recorded on. Either the said side groups cannot be oriented uniformly over the entire recording layer or they exhibit phase transitions in a temperature range which is not suitable in practice. Frequently, the liquid crystalline order state of the chiral mesogenic side groups, which state results on heating of the polymers, cannot be frozen in glassy form at room temperature, or an undesirable liquid crystalline order state is frozen at room temperature. The latter occurs in particular when the chiral mesogenic side groups pass through liquid crystalline phases on heating and subsequent cooling of the polymers, which phases are not adapted to the intended use under discussion, owing to the sequence in which they occur. Thus, it is quite possible that, when the recording layer is cooled, instead of the desired $S_{c^*}$ order state another smectic or cholesteric liquid crystalline order state or even the disordered isotropic state is frozen in glassy form at room temperature. Sometimes the known polymers or their chiral mesogenic side groups have a rotational viscosity [$\epsilon_{rot}$] which is too high and/or a dipole moment which is too low, resulting in a switching time $\tau$ which is too long for practical requirements. Furthermore, thermal decomposition of the polymers by the incident laser light often occurs before they have reached their clear point, i.e. before the chiral mesogenic side groups have reached their isotropic I phase.

If the proposals of DE-A-38 23 153, DE-A-38 23 154, EP-A-0 184 482, EP-A-0 228 703, EP-A-0 258 898, DE-A-36 03 267, DE-A-36 03 268 or EP-A-0 271 900 are followed and the conventional polymers having chiral mesogenic side groups are used for purposes of data storage with the aid of laser-optical recording elements which can be repeatedly erased and recorded on, the stated disadvantages of these polymers in the said recording elements are particularly clear Thus, the relevant laser-optical recording elements cannot be repeatedly recorded on, read and erased in the rapid and reliable manner actually required in practice. Furthermore, they have a poor signal-to-noise ratio and/or their long-term stability does not meet the requirements. The inevitable consequence of this is that the conventional laser-optical recording elements which can be repeatedly erased and recorded on must be further developed so that they meet the steadily growing practical requirements. However, it is known that even small changes in the molecular structure of the chiral mesogenic side groups of the known polymers often result in a serious change in their liquid crystalline behavior, which makes selective further development considerably more difficult.

It is an object of the present invention to provide a novel laser-optical recording element which can be repeatedly erased and recorded on and which does not have the disadvantages of the prior art.

It is a further object of the present invention to provide novel monomers for the synthesis of novel polymers having chiral mesogenic side groups, which exhibit ferroelectric smectic liquid crystalline ($S_{c^*}$) behavior.

It is a further object of the present invention to provide novel polymers which are suitable for use in laser-optical recording elements which can be repeatedly erased and recorded on.

We have found that this object is achieved, surprisingly, with the aid of a novel laser-optical recording element which can be repeatedly erased and recorded on and which comprises a recording layer exhibiting enantiotropic, ferroelectric smectic liquid crystalline ($S_{c^*}$) behavior, the recording layer containing a polymer having chiral mesogenic side groups or consisting of such a polymer. The chiral mesogenic side groups of this polymer may form an enantiotropic, ferroelectric smectic liquid crystalline $S_{c^*}$ phase in a certain suitable temperature range, and it is for this reason that they are very suitable for the intended use under discussion.

Surprisingly, the novel monomers I, with the aid of which these polymers having chiral mesogenic side groups can be prepared, have contributed to this solution.

Accordingly, the present invention relates to a laser-optical recording element which can be repeatedly erased and recorded on and which contains a) a recording layer which exhibits enantiotropic, ferroelectric smectic liquid crystalline ($S_{c^*}$) behavior and can be switched back and forth between two thermodynamically stable, optically distinguishable, ferroelectric smectic liquid crystalline $S_{c^*}$ order states on exposure to a laser beam of sufficient luminous power by applying an external electric field, wherein its recording layer (a) contains one or more polymers having chiral mesogenic side groups or consists of one or more of these polymers, and the polymers can be prepared using the novel monomers of the general formula I

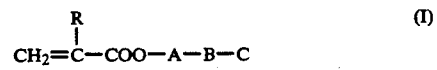

(I)

where the variables have the meanings described above, and/or using the novel monomers I which contain specially selected molecular moieties B in novel combination with selected molecular moieties C.

The present invention furthermore relates to the novel polymers which have chiral mesogenic side groups, are prepared using the novel monomers I and are designated below with P.

The present invention also relates to a novel method for repeated recording, reading and erasing of data, which is carried out with the aid of the novel laser-optical recording element which can be repeatedly erased and recorded on.

In view of the prior art, the many alterable parameters and the possibilities for varying and combining them and in view of the known fact that even small changes in the molecular structure of the chiral mesogenic side groups of polymers may lead to a radical change in the liquid crystalline behavior, it could not be foreseen that the object of the invention could be achieved by the novel monomers I, the novel polymers P prepared therefrom and the novel laser-optical recording element which can be repeatedly erased and recorded on and has a recording layer (a) which contains, or consists of, the novel polymers P.

The novel laser-optical recording element according to the invention, which can be repeatedly erased and recorded on, is referred to below briefly as novel recording element.

That component of the novel recording element which is essential to the invention is its novel recording layer (a) exhibiting enantiotropic, ferroelectric smectic liquid crystalline ($S_{c^*}$)c behavior. The novel recording layer (a) can be switched back and forth between two thermodynamically stable, optically distinguishable ferroelectric smectic liquid crystalline $S_{c^*}$ order states on exposure to a laser beam of sufficient luminous power, by applying an external electric field.

According to the invention, it is very particularly advantageous if, after the novel recording layer (a) has been heated and cooled, the two local thermodynamically stable (enantiotropic), ferroelectric smectic liquid crystalline $S_{c^*}$ order states which are optically distinguishable from one another can be frozen in glassy form at room temperature.

The novel recording layer (a) has an additional advantage when the chiral mesogenic side groups which it contains undergo a transformation below 200° C. into the isotropic I phase, i.e. have a clear point below 200° C.

In the novel recording layer (a), the microlayer planes of the $S_{c^*}$ phase, which is formed from the chiral mesogenic side groups which it contains, are oriented at right angles to the plane of the novel recording layer (a), which is generally referred to as homeotropic orientation. Here, the longitudinal axes of the chiral mesogenic side groups are inclined in the direction of a director n at an angle of tilt $\Theta$ of $+\alpha$ or $-\alpha$ with respect to the normals Z of the microlayer planes. According to the invention, it is advantageous if the angle of tilt $\Theta$ is from $+0.5°$ to $+35°$, in particular $+1°$ to $+25°$, or from $-0.5°$ to $-35°$, in particular from $-1°$ to $-25°$.

The novel recording layer (a) advantageously has a spontaneous ferroelectric polarization $P_s$ or a dipole density or a sum of aligned dipole moments per unit volume of the recording layer (a) of from 1 to 300 $nC/cm^2$.

Advantageous novel recording layers (a) have a thickness d of from 0.1 to 5 $\mu$m. If the novel recording layer (a) is more than 5 $\mu$m thick, the result may be a loss of bistability, whereas a thickness d of <0.1 $\mu$m may result in a deformation of the novel recording layer (a), for example due to capillary effects. The thickness range from 0.1 to 5 $\mu$m is thus an optimum within which the thickness d of the novel recording layer (a) can be widely varied and adapted to the particular requirements which arise from the particular performance characteristics desired on the one hand and the physicochemical properties of the particular polymers P used on the other hand.

Particularly advantageous novel recording layers (a) have a thickness d of from 0.1 to 2.5 $\mu$m, in particular from 0.1 to 0.8 $\mu$m, the thickness range from 0.2 to 0.5 $\mu$m once again being particularly noteworthy because the novel recording layers (a) of this thickness range have very particular advantages in terms of their recording, reading and erasing behavior The novel recording layer (a) has a switching time $\tau$ of less than one millisecond (ms) at above room temperature. It is particularly advantageous if the switching time $\tau$ of the novel recording layer (a) is less than 100 microseconds ($\mu$s) at a temperature which is 1° C. below the phase transition $S_{c^*} \rightarrow S_{A^*}$. Novel recording layers (a) which have switching times $\tau$ of this order of magnitude are very particularly preferred for the production of the novel recording elements.

According to the invention, the novel recording layer (a) contains one or more novel polymers P having chiral mesogenic side groups or consists of one or more novel polymers P. Particularly preferred novel polymers P here are all those whose chiral mesogenic side groups form an enantiotropic, ferroelectric smectic liquid crystalline $S_{c^*}$ phase at from 50 to 140° C.

According to the invention, the novel polymers P are prepared using the novel monomers of the general formula I

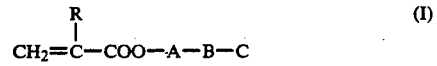

In the general formula I, R is hydrogen, chlorine or methyl, A is a flexible space-maintaining long-chain molecular moiety, C is very generally an optically active chiral molecular moiety and B is a mesogenic molecular moiety which consists of three or more aromatic nuclei bonded linearly or virtually linearly to one another and which contains one or more naphth-2,6-ylene groups.

Examples of suitable mesogenic molecular moieties B are groups of the general formula II

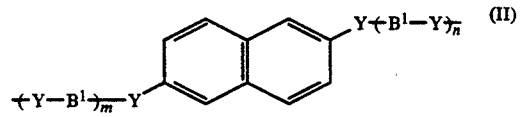

In the general formula II, $B^1$ is a p-phenylene group and/or a biphenyl-4,4'-diyl group, Y is an ether, methylene ether (—CH$_2$—O— or —O—CH$_2$—), ester (—COO— or —OOC—) or thioester (—COS— or —SOC—) group or a carbon-carbon single bond, m and n are each 0 or 1 or an integer >1, and n cannot be 0 when m is 0.

Examples of suitable mesogenic molecular moieties B of the general formula II are those in which m and n have the following meanings:

m=1 and n=0,
m=2 and n=0 and
m=1 and n=1,
and Y is an ether, methylene ether, ester and/or thioester.

Particularly suitable mesogenic molecular moieties B of the general formula II are those which meet the abovementioned conditions and which are bonded to the flexible space-maintaining long-chain molecular moiety A via an ether group.

Examples of very particularly suitable mesogenic molecular moieties B of the general formula II are the groups II-1 to II-5:

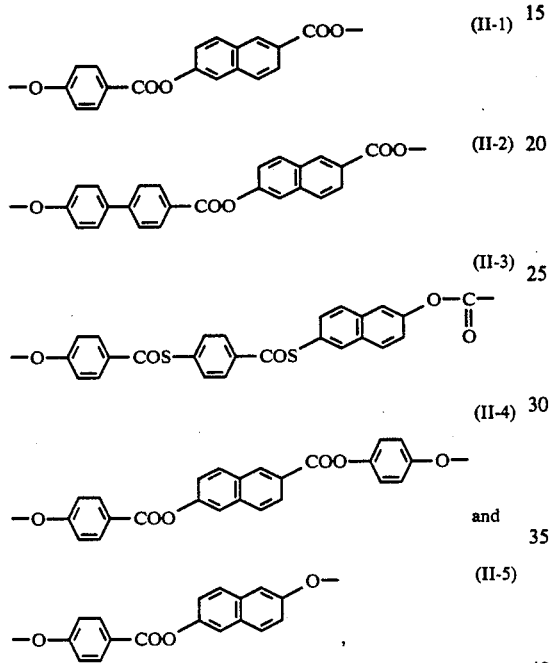

of which the group II-1 is very particularly advantageous.

The flexible space-maintaining long-chain molecular moiety A is in general a long-chain alkylene group whose carbon chain may be interrupted by ether, thioether and/or N-alkylimino groups and/or substituted by short-chain alkyl groups.

Suitable molecular moieties A are long-chain alkylene groups of the general formula V

 (V)

where k is an integer of from 1 to 30, preferably from 5 to 20, particularly preferably from 8 to 15, in particular from 9 to 12. In specific cases, it has proven advantageous if k is 6 or 8.

Examples of suitable optically active chiral molecular moieties C are groups of the general formula VI

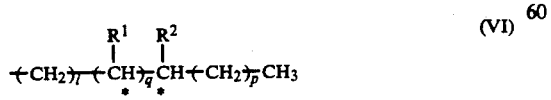 (VI)

In formula VI, $R^1$ is halogen, $R^2$ is methyl, cyano or halogen, l is 0 or an integer of from 1 to 0, q is 0 or 1 and p is 0 or an integer of from 1 to 10, and p may not be 0 when $R^2$ is methyl.

Examples of suitable molecular moieties C of the general formula VI are the groups VI-1 to VI-10:

 (VI-1)

 (VI-2)

 (VI-3)

 (VI-4)

 (VI-6)

 (VI-7)

 (VI-8)

 (VI-9)

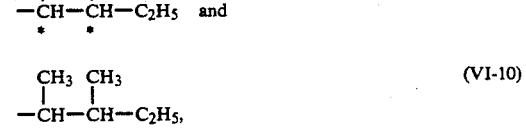 (VI-10)

of which the groups VI-7 and VI-8 are particularly suitable.

Further examples of suitable molecular moieties C are pinan-3-yl, champhan-2-yl and p-menthan-3-yl, of which pinan-3-yl and p-menthan-3-yl are particularly suitable.

Other examples of suitable molecular moieties C are groups of the general formula VII

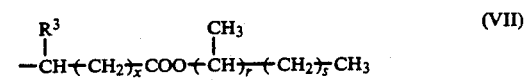 (VII)

where $R^3$ is methyl or trifluoromethyl, x and r independently of one another are each 0 or 1 and s is an integer of from 1 to 3.

Examples of suitable molecular moieties C of the general formula VII are the groups VII-1 to VII-7:

 (VII-1)

 (VII-2)

-continued

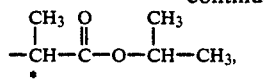 (VII-3)

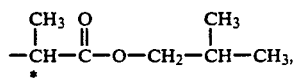 (VII-4)

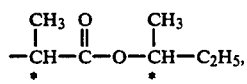 (VII-5)

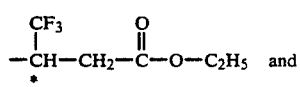 (VII-6) and

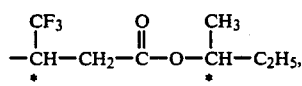 (VII-7)

of which the groups VII-2 and VII-6 are particularly suitable.

Other examples of suitable molecular moieties C are groups of the general formula VIII

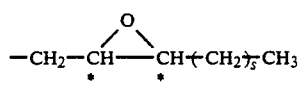 (VIII)

where s has the abovementioned meanings.

Examples of suitable molecular moieties C of the general formula VIII are the groups VIII-1 to VIII-3:

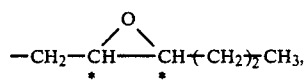 (VIII-1)

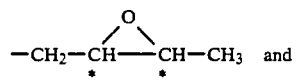 (VIII-1)

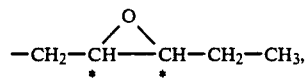 (VIII-3)

of which the group VIII-1 i particularly suitable.

Other examples of suitable molecular moieties C are groups of the general formula IX $$-(CH_2)_t-(O)_y-(CH_2)_u-\overset{CH_3}{\underset{*}{CH}}-O-(CH_2)_v-CH_3 \quad (IX)$$

where t, u and v independently of one another are each an integer of from 1 to 10, t and u independently of one another may furthermore be 0, and y is 0 or 1.

Examples of suitable molecular moieties C of the general formula IX are the groups IX-1 to IX-7:

$$-\overset{CH_3}{\underset{*}{CH}}-O-(CH_2)_7-CH_3, \quad (IX-1)$$

$$-CH_2-\overset{CH_3}{\underset{*}{CH}}-O-CH_3, \quad (IX-2)$$

$$-CH_2-\overset{CH_3}{\underset{*}{CH}}-O-C_2H_5, \quad (IX-3)$$

$$-CH_2-\overset{CH_3}{\underset{*}{CH}}-O-C_3H_7, \quad (IX-4)$$

$$-(CH_2)_3-O-CH_2-\overset{CH_3}{\underset{*}{CH}}-O-C_2H_5, \quad (IX-5)$$

$$-(CH_2)_4-O-CH_2-\overset{CH_3}{\underset{*}{CH}}-O-C_2H_5 \quad (IX-6)$$

and $$-(CH_2)_5-O-CH_2-\overset{CH_3}{\underset{*}{CH}}-O-C_2H_5, \quad (IX-7)$$

of which the groups IX-1 to IX-5 are particularly suitable.

Examples of suitable novel monomers I, which contain a mesogenic molecular moiety B of the general formula II and which, according to the invention, are particularly advantageously used for the preparation of the novel polymers P having chiral mesogenic side groups, are the monomers I-1 to I-110:

| Molecular moiety A | Molecular moiety B | Molecular moiety C | |
|---|---|---|---|
| 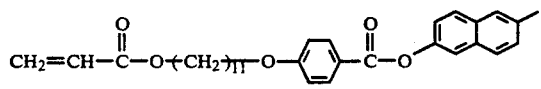 | | 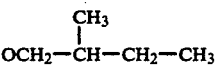 | (I-1), |
| " | |  | (I-2), |
| " | |  | |

| Molecular moiety A | Molecular moiety B | Molecular moiety C | |
|---|---|---|---|
| " | ...—CH₂—CH(Cl)—CH₃ | | (I-4), |
| " | ...—(CH₂)₂—CH(CH₃)—CH₂—CH₃ | | (I-5), |
| " | ...—(CH₂)₃—CH(CH₃)—CH₂—CH₃ | | (I-6), |
| " | ...—(CH₂)₅—CH(CH₃)—CH₂—CH₃ | | (I-7), |
| " | ...—CH(CH₃)—C(=O)—O—CH₃ | | (I-8), |
| " | ...—CH(CH₃)—C(=O)—O—CH₂—CH₃ | | (I-9), |
| " | ...—CH(CH₃)—C(=O)—O—CH(CH₃)—CH₃ | | (I-10), |
| " | ...—CH(CH₃)—C(=O)—O—CH₂—CH(CH₃)—CH₃ | | (I-11), |
| " | ...—CH(CH₃)—C(=O)—O—CH(CH₃)—CH₂—CH₃ | | (I-12), |
| " | ...—CH(CF₃)—CH₂—C(=O)—O—CH₂—CH₃ | | (I-13), |
| " | ...—CH(CF₃)—CH₂—C(=O)—O—CH(CH₃)—CH₂—CH₃ | | (I-14), |
| " | ...—CH₂—CH(—O—)CH—(CH₂)₂CH₃ (epoxide) | | (I-15), |
| " | ...—CH₂—CH(—O—)CH—CH₃ (epoxide) | | (I-16), |
| " | ...—CH₂—CH(—O—)CH—CH₂—CH₃ (epoxide) | | (I-17), |
| " | ...—CH₂—CH(CH₃)—O—CH₃ | | (I-18), |
| " | ...—CH₂—CH(CH₃)—O—CH₂—CH₃ | | (I-19), |

-continued
| Molecular moiety A | Molecular moiety B | Molecular moiety C | |
|---|---|---|---|
| " | | 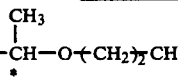 | (I-20), |
| hd 3 | | | |
| " | | 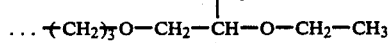 | (I-21), |
| " | | 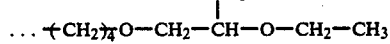 | (I-22), |
| " | | 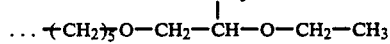 | (I-23), |
| " | | 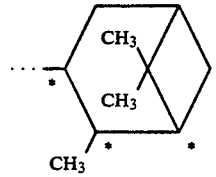 | (I-24), |
| " | | 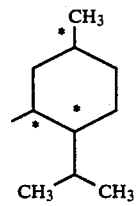 | (I-25) |
| | | and | |
| " | | 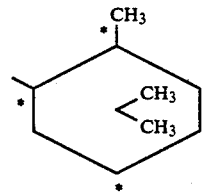 | (I-26); |
| Molecular moiety A | Molecular moiety B | Molecular moiety C |
|---|---|---|
| 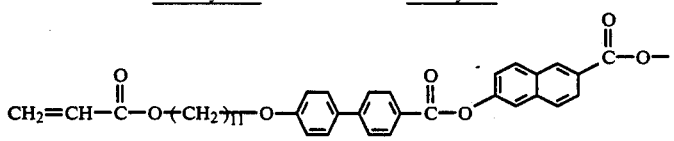 | | |
| | " | such as (I-1): (I-27), |
| | " | such as (I-2): (I-28), |
| | " | such as (I-3): (I-29), |
| | " | such as (I-4): (I-30), |
| | " | such as (I-5): (I-31), |
| | " | such as (I-6): (I-32), |
| | " | such as (I-7): (I-33), |
| | " | such as (I-8): (I-34), |
| | " | such as (I-9): (I-35), |
| | " | such as (I-10): (I-36), |
| | " | such as (I-11): (I-37), |
| | " | such as (I-12): (I-38), |
| | " | such as (I-13): (I-39), |
| | " | such as (I-14): (I-40), |
| | " | such as (I-15): (I-41), |
| | " | such as (I-16): (I-42), |
| | " | such as (I-17): (I-43), |
| | " | such as (I-18): (I-44), |

-continued

| Molecular moiety A | Molecular moiety B | Molecular moiety C |
|---|---|---|
| | " | such as (I-19): (I-45), |
| | " | such as (I-20): (I-46), |
| | " | such as (I-21): (I-47), |
| | " | such as (I-22): (I-48), |
| | " | such as (I-23): (I-49), |
| | " | such as (I-24): (I-50), |
| | " | such as (I-25): (I-51) and |
| | " | such as (I-26): (I-52); |

| Molecular moiety A | Molecular moiety B | Molecular moiety C |
|---|---|---|
| 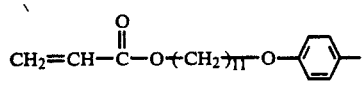 | 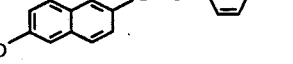 | such as (I-1): (I-53), |
| | " | such as (I-2): (I-54), |
| | " | such as (I-3): (I-55), |
| | " | such as (I-4): (I-56), |
| | " | such as (I-5): (I-57), |
| | " | such as (I-6): (I-58), |
| | " | such as (I-7): (I-59), |
| | " | such as (I-8): (I-60), |
| | " | such as (I-9): (I-61), |
| | " | such as (I-10): (I-62), |
| | " | such as (I-11): (I-63), |
| | " | such as (I-12): (I-64), |
| | " | such as (I-13): (I-65), |
| | " | such as (I-14): (I-66), |
| | " | such as (I-15): (I-67), |
| | " | such as (I-16): (I-68), |
| | " | such as (I-17): (I-69), |
| | " | such as (I-18): (I-70), |
| | " | such as (I-19): (I-71), |
| | " | such as (I-20): (I-72), |
| | " | such as (I-21): (I-73), |
| | " | such as (I-22): (I-74), |
| | " | such as (I-23): (I-75), |
| | " | such as (I-24): (I-76), |
| | " | such as (I-25): (I-77) and |
| | " | such as (I-26): (I-78); |

| Molecular moiety A | Molecular moiety B | Molecular moiety C |
|---|---|---|
| 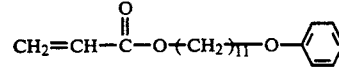 | 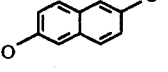 | such as (I-1): (I-79), |
| | " | such as (I-2): (I-80), |
| | " | such as (I-3): (I-81), |
| | " | such as (I-4): (I-82), |
| | " | such as (I-5): (I-83), |
| | " | such as (I-6): (I-84), |
| | " | such as (I-7): (I-85), |
| | " | such as (I-8): (I-86), |
| | " | such as (I-9): (I-87), |
| | " | such as (I-10): (I-88), |
| | " | such as (I-11): (I-89), |
| | " | such as (I-12): (I-90), |
| | " | such as (I-13): (I-91), |
| | " | such as (I-14): (I-92), |
| | " | such as (I-15): (I-93), |
| | " | such as (I-16): (I-94), |
| | " | such as (I-17): (I-95), |
| | " | such as (I-18): (I-96), |
| | " | such as (I-19): (I-97), |
| | " | such as (I-20): (I-98), |
| | " | such as (I-21): (I-99), |
| | " | such as (I-22): (I-100), |
| | " | such as (I-23): (I-101), |
| | " | such as (I-24): (I-102), |
| | " | such as (I-25): (I-103) |

| Molecular moiety A | Molecular moiety B | Molecular moiety C |
|---|---|---| and such as (I-26): (I-104);

| Molecular moiety A | Molecular moiety B | Molecular moiety C | |
|---|---|---|---|
| 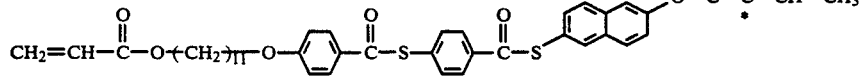 | | | (I-105), |
| " | | 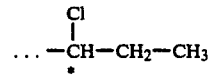 | (I-106), |
| " | | 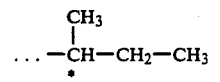 | (I-107), |
| " | | 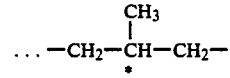 | (I-108), |
| " | | 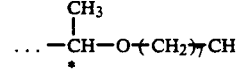 | (I-109), | and

| " | | 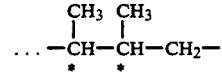 | (I-110), |
|---|---|---|---|

Examples of other suitable novel monomers I are those of the general formula I where R, A and C have the above-mentioned meanings and the mesogenic moiety B consisting of three or more aromatic nuclei bonded linearly or virtually linearly to one another is a group of the general formula III

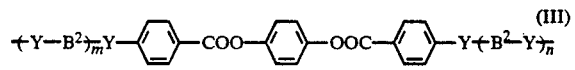 (III)

where Y, m and n have the abovementioned meanings, m and n here may both be 0 and $B^2$ is a p-phenylene, biphenyl-4,4'-diyl and/or napth-2,6-ylene.

Examples of other suitable novel monomers I are those in which $B^2$ is a p-phenylene group, m and n have the following meanings:

m = 1 and n = 1,
m = 1 and n = 0,
m = 0 and n = 1 or
m = 0 and n = 0,
and Y is an ether or ester group.

Examples of suitable molecular moieties B of the general formula III are the groups III-1 to III-5:

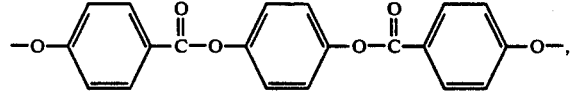 (III-1)

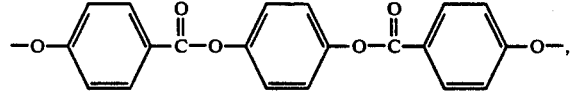 (III-2)

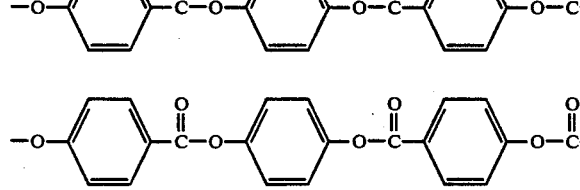 (III-3)

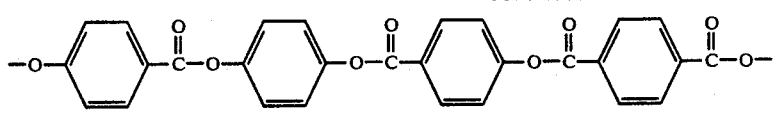

(III-4)

and

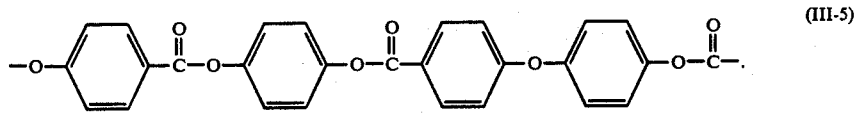

(III-5)

Among these, group III-1 is particularly suitable, a further advantage being obtained if groups III-1 to III-5 are bonded to molecular moiety A via an ether group.

Examples of other suitable novel monomers I which contain a group of the general formula III as the mesogenic molecular moiety B and which, according to the invention, are particularly advantageously used for the preparation of the novel polymers P having chiral mesogenic side groups ar the novel monomers I-3 to I-174:

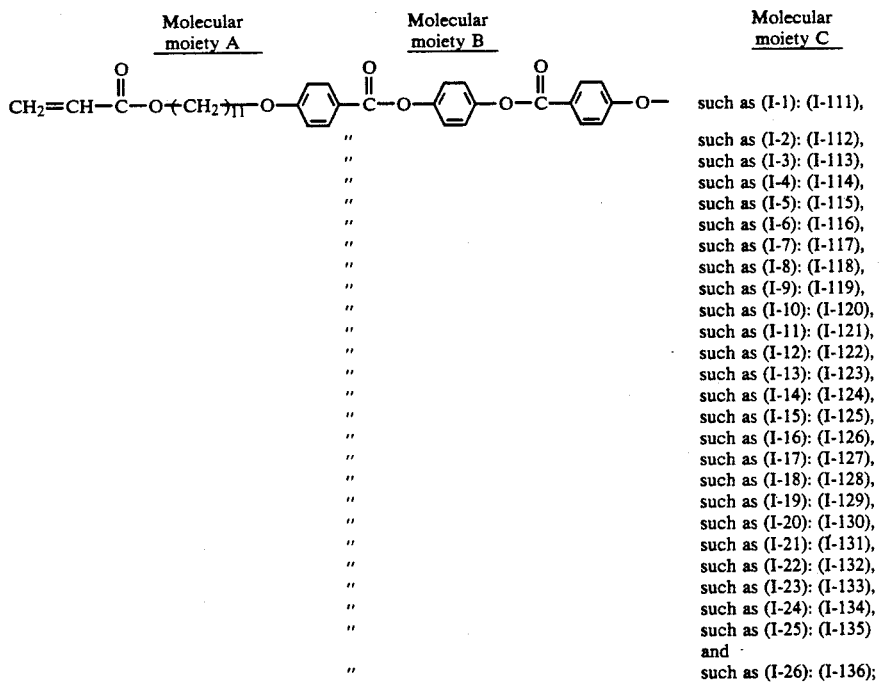

| | | Molecular moiety C |
|---|---|---|
| | | such as (I-1): (I-111), |
| | | such as (I-2): (I-112), |
| | | such as (I-3): (I-113), |
| | | such as (I-4): (I-114), |
| | | such as (I-5): (I-115), |
| | | such as (I-6): (I-116), |
| | | such as (I-7): (I-117), |
| | | such as (I-8): (I-118), |
| | | such as (I-9): (I-119), |
| | | such as (I-10): (I-120), |
| | | such as (I-11): (I-121), |
| | | such as (I-12): (I-122), |
| | | such as (I-13): (I-123), |
| | | such as (I-14): (I-124), |
| | | such as (I-15): (I-125), |
| | | such as (I-16): (I-126), |
| | | such as (I-17): (I-127), |
| | | such as (I-18): (I-128), |
| | | such as (I-19): (I-129), |
| | | such as (I-20): (I-130), |
| | | such as (I-21): (I-131), |
| | | such as (I-22): (I-132), |
| | | such as (I-23): (I-133), |
| | | such as (I-24): (I-134), |
| | | such as (I-25): (I-135) and |
| | | such as (I-26): (I-136); |

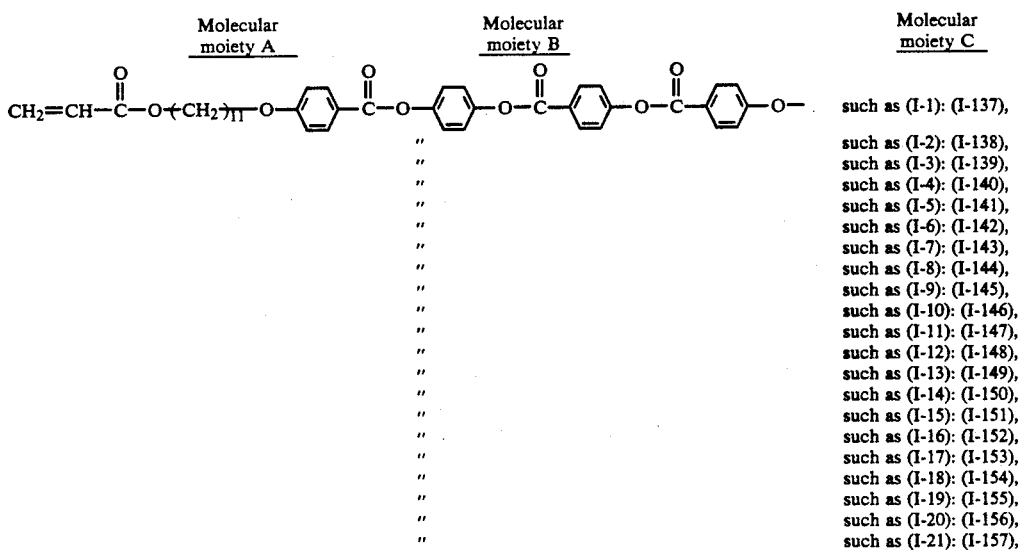

| | | Molecular moiety C |
|---|---|---|
| | | such as (I-1): (I-137), |
| | | such as (I-2): (I-138), |
| | | such as (I-3): (I-139), |
| | | such as (I-4): (I-140), |
| | | such as (I-5): (I-141), |
| | | such as (I-6): (I-142), |
| | | such as (I-7): (I-143), |
| | | such as (I-8): (I-144), |
| | | such as (I-9): (I-145), |
| | | such as (I-10): (I-146), |
| | | such as (I-11): (I-147), |
| | | such as (I-12): (I-148), |
| | | such as (I-13): (I-149), |
| | | such as (I-14): (I-150), |
| | | such as (I-15): (I-151), |
| | | such as (I-16): (I-152), |
| | | such as (I-17): (I-153), |
| | | such as (I-18): (I-154), |
| | | such as (I-19): (I-155), |
| | | such as (I-20): (I-156), |
| | | such as (I-21): (I-157), |

| Molecular moiety A | Molecular moiety B | Molecular moiety C |
|---|---|---|
| | " | such as (I-22): (I-158), |
| | " | such as (I-23): (I-159), |
| | " | such as (I-24): (I-160), |
| | " | such as (I-25): (I-161) and |
| | " | such as (I-26): (I-162); |

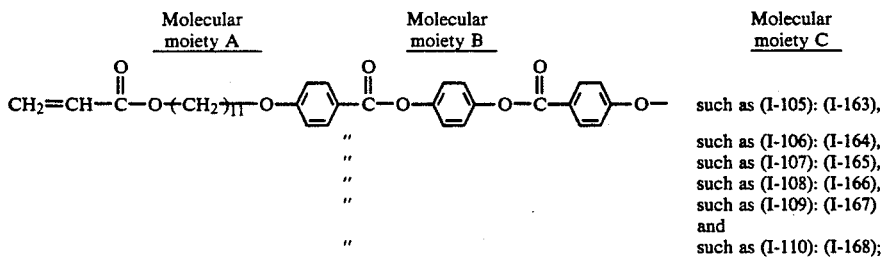

| Molecular moiety A | Molecular moiety B | Molecular moiety C |
|---|---|---|
| | | such as (I-105): (I-163), |
| | " | such as (I-106): (I-164), |
| | " | such as (I-107): (I-165), |
| | " | such as (I-108): (I-166), |
| | " | such as (I-109): (I-167) and |
| | " | such as (I-110): (I-168); |

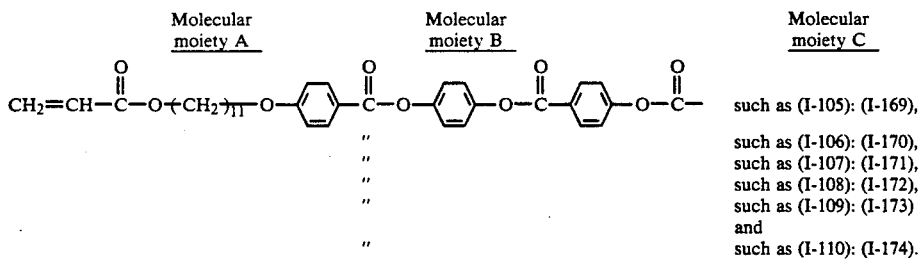

| Molecular moiety A | Molecular moiety B | Molecular moiety C |
|---|---|---|
| | | such as (I-105): (I-169), |
| | " | such as (I-106): (I-170), |
| | " | such as (I-107): (I-171), |
| | " | such as (I-108): (I-172), |
| | " | such as (I-109): (I-173) and |
| | " | such as (I-110): (I-174). |

Examples of other suitable monomers I of the abovementioned general formula I are those in which R, A and C have the abovementioned meanings and the mesogenic molecular moiety B consisting of four or more aromatic nuclei bonded linearly or virtually linearly to one another is a group of the general formula IV.

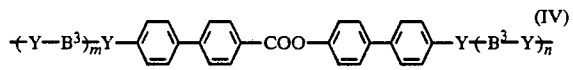 (IV)

In the general formula IV, Y, m and n have the abovementioned meanings, m and n here may both be 0 and $B^3$ is a p-phenylene, a biphenyl-4,4'-diyl and/or a napth-2,6-ylene group and/or a group III-1.

Examples of suitable molecular moieties B of the general formula IV are those in which Y is an ether or ester group, m and n have the following meanings:
m=1 and n=1,
m=1 and n=0,
m=0 and n=1 or
m=0 and n=0,
and $B^3$ is a p-phenylene group.

Examples of suitable molecular moieties B of the general formula IV are the groups IV-1 to IV-3

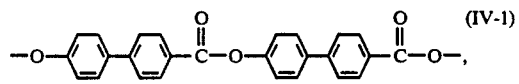 (IV-1)

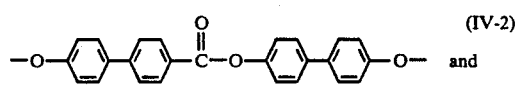 (IV-2) and

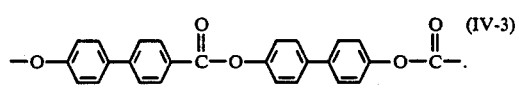 (IV-3).

Among these, the group IV-1 is particularly suitable, and an additional advantage is obtained if group IV-1 is bonded to molecular moiety A via the ether group.

Examples of other suitable novel monomers I, which contain a group of the general formula IV as the mesogenic molecular moiety B and which, according to the invention, are particularly advantageously used for the preparation of the novel polymers P having chiral mesogenic side groups, are accordingly the monomers I-175 to I-232:

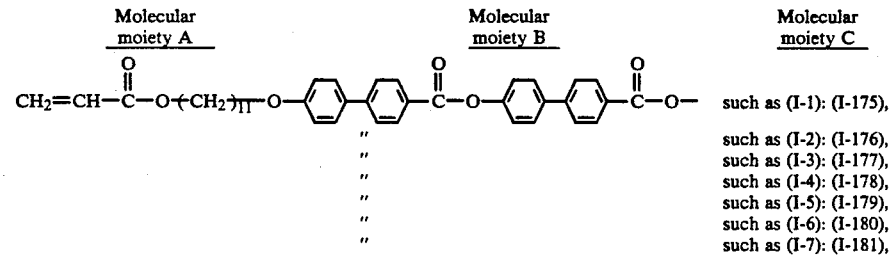

| Molecular moiety A | Molecular moiety B | Molecular moiety C |
|---|---|---|
| | | such as (I-1): (I-175), |
| | " | such as (I-2): (I-176), |
| | " | such as (I-3): (I-177), |
| | " | such as (I-4): (I-178), |
| | " | such as (I-5): (I-179), |
| | " | such as (I-6): (I-180), |
| | " | such as (I-7): (I-181), |

| Molecular moiety A | Molecular moiety B | Molecular moiety C |
|---|---|---|
| | " | such as (I-8): (I-182), |
| | " | such as (I-9): (I-183), |
| | " | such as (I-10): (I-184), |
| | " | such as (I-11): (I-185), |
| | " | such as (I-12): (I-186), |
| | " | such as (I-13): (I-187), |
| | " | such as (I-14): (I-188), |
| | " | such as (I-15): (I-189), |
| | " | such as (I-16): (I-190), |
| | " | such as (I-17): (I-191), |
| | " | such as (I-18): (I-192), |
| | " | such as (I-19): (I-193), |
| | " | such as (I-20): (I-194), |
| | " | such as (I-21): (I-195), |
| | " | such as (I-22): (I-196), |
| | " | such as (I-23): (I-197), |
| | " | such as (I-24): (I-198), |
| | " | such as (I-25): (I-199) and |
| | " | such as (I-26): (I-200); |

| Molecular moiety A | Molecular moiety B | Molecular moiety C |
|---|---|---|
| $CH_2=CH-\overset{O}{\underset{\|}{C}}-O-(CH_2)_{\overline{n}}-O-\bigcirc-\bigcirc-\overset{O}{\underset{\|}{C}}-O-\bigcirc-\bigcirc-O-$ | | such as (I-1): (I-201), |
| | " | such as (I-2): (I-202), |
| | " | such as (I-3): (I-203), |
| | " | such as (I-4): (I-204), |
| | " | such as (I-5): (I-205), |
| | " | such as (I-6): (I-206), |
| | " | such as (I-7): (I-207), |
| | " | such as (I-8): (I-208), |
| | " | such as (I-9): (I-209), |
| | " | such as (I-10): (I-210), |
| | " | such as (I-11): (I-211), |
| | " | such as (I-12): (I-212), |
| | " | such as (I-13): (I-213), |
| | " | such as (I-14): (I-214), |
| | " | such as (I-15): (I-215), |
| | " | such as (I-16): (I-216), |
| | " | such as (I-17): (I-217), |
| | " | such as (I-18): (I-218), |
| | " | such as (I-19): (I-219), |
| | " | such as (I-20): (I-220), |
| | " | such as (I-21): (I-221), |
| | " | such as (I-22): (I-222), |
| | " | such as (I-23): (I-223), |
| | " | such as (I-24): (I-224), |
| | " | such as (I-25): (I-225) and |
| | " | such as (I-26): (I-226); |

| Molecular moiety A | Molecular moiety B | Molecular moiety C |
|---|---|---|
| $CH_2=CH-\overset{O}{\underset{\|}{C}}-O-(CH_2)_{\overline{n}}-O-\bigcirc-\bigcirc-\overset{O}{\underset{\|}{C}}-O-\bigcirc-\bigcirc-O-\overset{O}{\underset{\|}{C}}-$ | | such as (I-105): (I-227), |
| | " | such as (I-106): (I-228), |
| | " | such as (I-107): (I-229), |
| | " | such as (I-108): (I-230), |
| | " | such as (I-109): (I-231) and |
| | " | such as (I-110): (I-232). |

Examples of other suitable novel monomers I of the abovementioned general formula I are those in which R and A have the abovementioned meanings and B is one of the groups X-1 to X-7

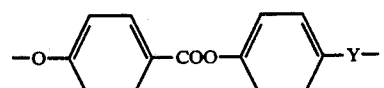
(X-1)

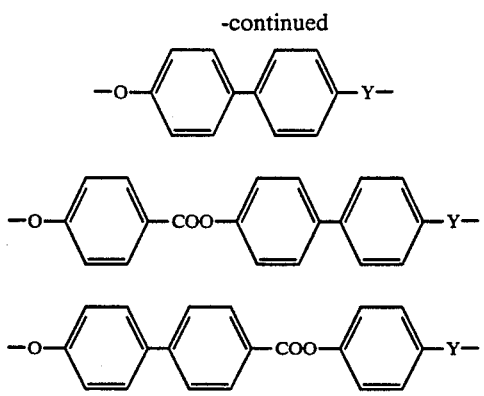

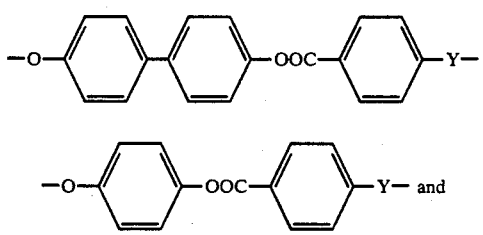

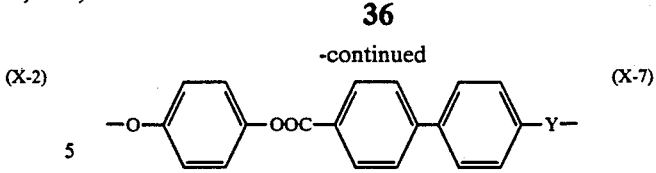

where Y has the abovementioned meanings, groups X-1 to X-7 are bonded via the ether group to molecular moiety A and molecular moiety C is a pinan-3-yl, camphan-2-yl or p-menthan-3-yl group or a group of the abovementioned general formula VII, VIII or IX.

Examples of other suitable novel monomers I which contain one of the groups X-1 to X-7 and one of the abovementioned groups as the molecular moiety C are the monomers I-233 to I-484:

Monomers I-233 to I-251:
Molecular moiety A                                    Molecular moiety B

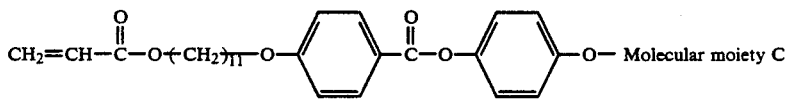

where molecular moiety C has the following meanings; (I-233) pinan-3-yl, (I-234) camphan-2-yl, (I-235) p-menthan-2-yl, (I-236) group VII-1, (I-237) group VII-2, (I-238) group VII-3, (I-239) group VII-4, (I-240) group VII-5, (I-241) group VII-6, (I-242) group VII-7, (I-243) group VIII-1, (I-244) group VIII-2, (I-245) group VIII-3, (I-246) group IX-2, (I-247) group IX-3, (I-248) group IX-4, (I-249) group IX-5, (I-250) group IX-6, (I-251) group IX-7;

Monomers I-252 to I-270:
Molecular moiety A                                    Molecular moiety B

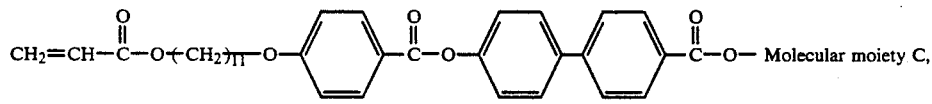

where molecular moiety C has the meanings stated for monomers I-233 to I-251;

Monomers I-271 to I-289:
Molecular moiety A                                    Molecular moiety B

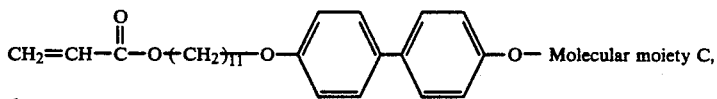

where molecular moiety C has the meanings stated for monomers I-233 to I251;

Monomers I-290 to I-308:
Molecular moiety A                                    Molecular moiety B

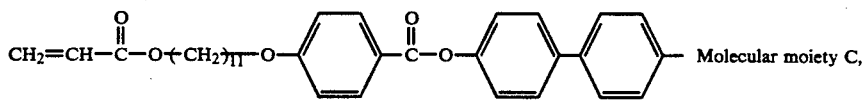

where molecular moiety C has the meanings stated for monomers I-233 to I-251;

Monomers I-309 to I-327:
Molecular moiety A                                    Molecular moiety B -continued

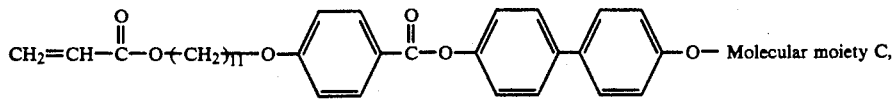

where molecular moiety C has the meanings stated for monomers I-233 to I-251;

moiety C has the meanings stated for monomer I-233 and where k is 6 instead of 11 or 8.

Monomers I-328 to I-346:

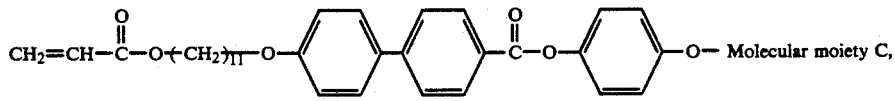

Monomers I-366 to I-384:

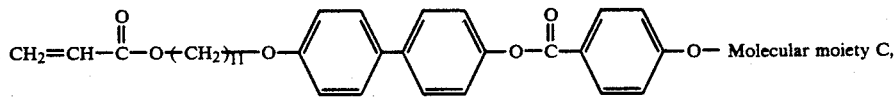

where molecular moiety C has the meanings stated for monomers I-233 to I-251 where molecular moiety C has the meanings stated for monomers I-233 to I-251;

Monomers I-347 to I-365:

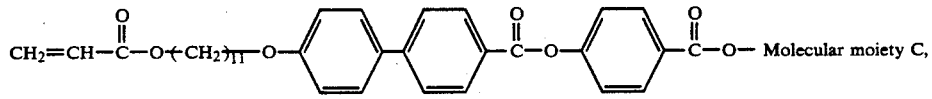

Monomers I-385 to I-403:

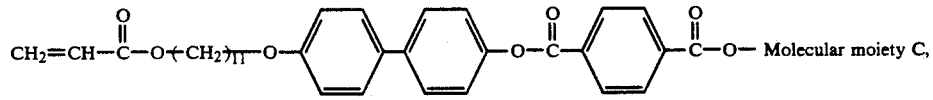

where molecular moiety C has the meanings stated for monomers I-233 to I-251, I-347a, where molecular moiety C has the meanings stated for monomer I-23 and where k is 8 instead of 11, and I-347b, where molecular where molecular moiety C has the meanings stated for monomers I-233 to I-251;

Monomers I-404 to I-422:

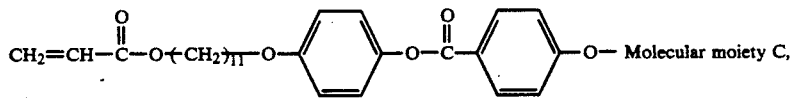

where molecular moiety C has the meanings stated for monomers I-233 to I-251;

Monomers I-423 to I-441:

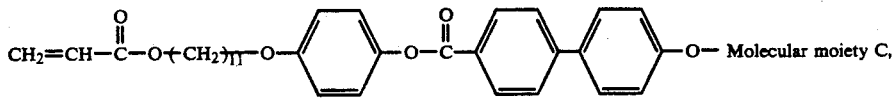

where molecular moiety C has the meanings stated for monomers I-233 to I-251;

Monomers I-442 to I-460:
Molecular moiety A            Molecular moiety B

-continued

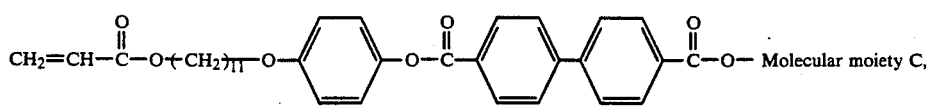

where molecular moiety C has the meanings stated for monomers I-233 to I-251;

I-347, -347a, -347b, -348, -349, -350, -351, -352, -353 and I-354;

Monomers I-461 to I-479:
Molecular moiety A    Molecular moiety B

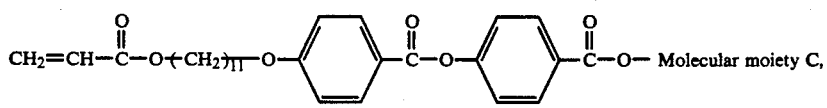

where molecular moiety C has the meanings stated for monomers I-233 to I-251;

I-366, -367, -368, -370 and I-373;
I-385, -386, -387, -389 and I-392;

Monomers I-480 to I-484:
Molecular moiety A    Molecular moiety B

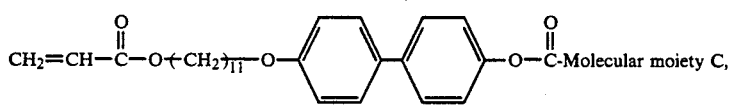

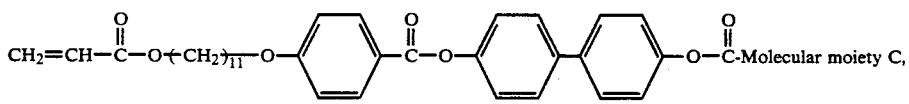

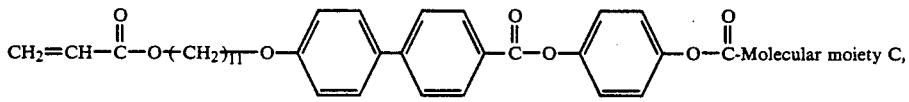

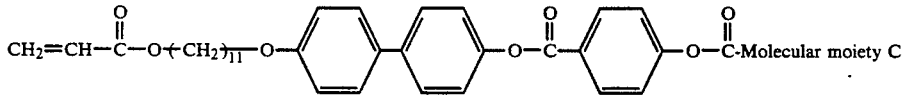

and

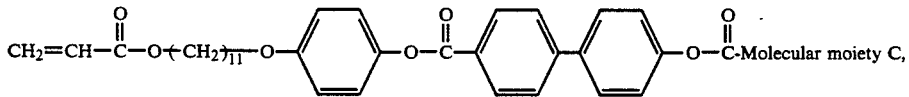

where molecular moiety C is a group IX-1.
Of all the novel monomers I, the novel monomers
I-1, -3, -12, -15, -20, -24 and I-25;
I-27, -29, -38, -41, -46, -50 and I-51;
I-53, -55, -64, -67, -72, -76 and I-77;
I-79, -81, -90, -93, -98, -102 and I-103;
I-106;
I-111, -113, -122, -125, -130, -134 and I-135;
I-137, -139, -148, -151, -156, -160 and I-161;
I-164; I-170; I-173;
I-175, -177, -186, -189, -194, -198 and I-199;
I-201, -203, -212, -215, -220, -224 and I-225;
I-228;
I-233, -234, -235, -237 and I-240;
I-252, -253, -254, -256 and I-259;
I-271, -272, -273, -275 and I-258;
I-290, -291, -292, -294 and I-297;
I-309, -310, -311, -313 and I-316;
I-328, -329, -330, -332 and I-335;
I-404, -405, -406, -408 and I-411;
I-423, -424, -425, -427 and I-430;
I-442, -443, -444, -446 and I-449;
I-461, -462, -463, -465 and I-468; and
I-481
are particularly suitable and the novel monomers I-1, -111, -173, -175, -347, -347a, -347b, -349, -350, -351, -352, -353, -354, -461 and I-481 are very particularly suitable.

In terms of the method, the preparation of the monomers I described above in detail has no special features but is carried out by the known organic synthesis methods conventionally used for the technical area under discussion, from suitable starting compounds which as such are conventional and known and may be commercially available. Regarding the synthesis methods, reference may be made, by way of example, to EP-A-0 258 898, EP-A-0 228 703, EP-A-0 184 482, DE-A-36 03 267 (EP-A-0 231 858), JP-A-45/62010, U.S. Pat. No. 4,638,073 or DE-A-36 03 268 (EP-A-0 231 857) and to the publications by G. Decobert et al. in Polymer Bulletin, 14 (1985), 179–186;

J. W. Goodby et al in Molecular Crystals and Liquid Crystals, 110 (1984), 175–203;

D. Coates et al. in Molecular Crystals and Liquid Crystals Letters, 3 Part 6 (1986), 184–195;

S. J. Fu et al. in J. Amer. Chem. Soc. 76 (1954), 6054 et seq.;

T. Inukai et al. in Molecular Crystals and Liquid Crystals, 141 (1986), 251–266;

B. Otterholm et al. in Molecular Crystals and Liquid Crystals, 146 (1987), 189–216;

K. Yoshino et al. in Japanese Journal of Applied Physics, 26 No. 2 (February 1987), L77 to L78;

D. M. Walba et al. in J. Amer. Chem. Soc. 108 (1986), 5210–5221;

D. Y. Byron et al. in Molecular Crystals and Liquid Crystals, 51 (1979), 265–272;

W. V. E. Doering in J. Amer. Chem. Soc. 74 (1953), 393 et seq.;

H. Finkelmann et al. in Makromol. Chem. 179 (1978), 273–276, and

V. P. Shibaev et al. in European Polymer Journal, 18 (1982), 651–659.

The conventional and known synthesis methods described there can be used without restriction for the preparation of the novel monomers I. Particularly advantageous combinations of the synthesis steps are shown schematically in the overview below.

Scheme

Overview of Examples of advantageous synthesis steps

Synthesis step 1

Synthesis step 1 is used for the preparation of building blocks of the general formula XI HO—(-Aryl-)-molecular moiety C    (XI)

where molecular moiety C may be a group VI, VII, VIII or IX and aryl may be p-phenylene, biphenyl-4,4'-diyl or naphth-2,6-ylene, and may be carried out as follows:

Synthesis step 1.1

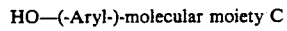 

(Group VII—)—OH $\xrightarrow{\text{p-toluenesulfonyl chloride}}{\text{pyridine}}$

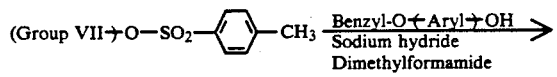

(Group VII—)—O—SO$_2$—⟨ ⟩—CH$_3$ $\xrightarrow{\text{Benzyl-O—(Aryl—)—OH}}{\substack{\text{Sodium hydride}\\\text{Dimethylformamide}}}$

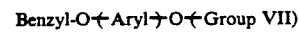

Benzyl-O—(Aryl—)—O—(Group VII)

Synthesis step 1.2

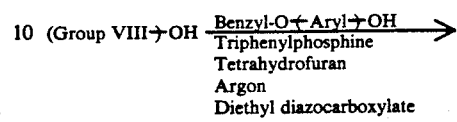

(Group VIII—)—OH $\xrightarrow{\text{Benzyl-O—(Aryl—)—OH}}{\substack{\text{Triphenylphosphine}\\\text{Tetrahydrofuran}\\\text{Argon}\\\text{Diethyl diazocarboxylate}}}$ Benzyl-O—(Aryl—)—O—(Group VIII)

Synthesis step 1.3

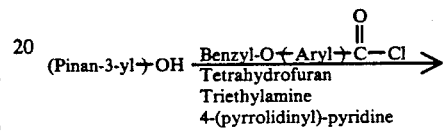

(Pinan-3-yl—)—OH $\xrightarrow{\text{Benzyl-O—(Aryl—)—C(=O)—Cl}}{\substack{\text{Tetrahydrofuran}\\\text{Triethylamine}\\\text{4-(pyrrolidinyl)-pyridine}}}$ Benzyl-O(-Aryl-)-O-(pinan-3-yl)

Synthesis step 1.4

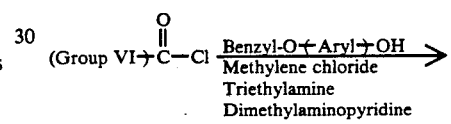

(Group VI—)—C(=O)—Cl $\xrightarrow{\text{Benzyl-O—(Aryl—)—OH}}{\substack{\text{Methylene chloride}\\\text{Triethylamine}\\\text{Dimethylaminopyridine}}}$ Benzyl-O—(Aryl—)—O—C(=O)—(Group VI)

Synthesis step 1.5

Synthesis step 1.5 is used for the preparation of the building block of the general formula XII

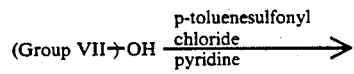

HO-(-Aryl-)-O—C(=O)—⟨ ⟩—O—CH$_2$-Molecular moiety C    (XII)

where the methylene group is part of molecular moiety C, and can be carried out as follows:

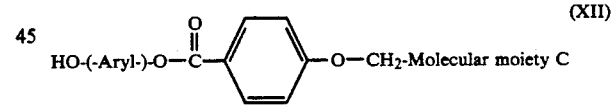

C$_2$H$_5$—O—C(=O)—⟨ ⟩—OH $\xrightarrow{\text{(Molecular moiety C—)CH}_2\text{—Br}}{\substack{\text{Dimethyl formamide}\\\text{K}_2\text{CO}_3}}$

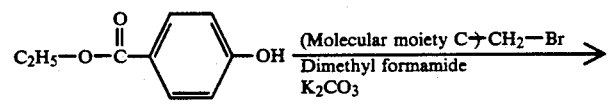

C$_2$H$_2$O—C(=O)—⟨ ⟩—O—CH$_2$-Molecular moiety C $\xrightarrow{\text{KOH}}{\text{Ethanol}}$

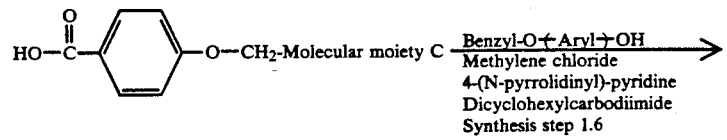

HO—C(=O)—⟨ ⟩—O—CH$_2$-Molecular moiety C $\xrightarrow{\text{Benzyl-O—(Aryl—)—OH}}{\substack{\text{Methylene chloride}\\\text{4-(N-pyrrolidinyl)-pyridine}\\\text{Dicyclohexylcarbodiimide}\\\text{Synthesis step 1.6}}}$ -continued

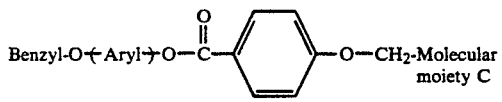

The benzyl ethers obtained by synthesis steps 1.1 to 1.5 can be cleaved in synthesis step 1.6 with the aid of hydrogen in the presence of Raney nickel, resulting in building blocks XI and XII.

Synthesis step 2

Synthesis step 2 is used for the preparation of building blocks of the general formula XIII

where k has the abovementioned meanings, and can be carried out as follows:

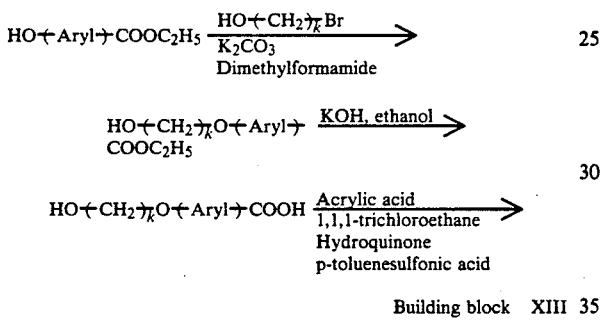

Synthesis step 3

In synthesis step 3, building blocks XI or XII (cf. synthesis steps 1.1 to 1.6) are reacted with building blocks XIII, for example in methylene chloride in the presence of dicyclohexylcarbodiimde and 4-(N-pyrrolidinyl)-pyridine, to give the novel monomers I.

The novel monomers I prepared in this manner can be used, instead of the known low molecular weight mesogenic compounds used to date, for all intended uses of the low molecular weight mesogenic compounds. Advantageously, however, they are used for the preparation of the novel polymers P having chiral mesogenic side groups which exhibit ferroelectric smectic liquid crystalline $S_{c^*}$ behavior.

The novel polymers P having chiral mesogenic side groups are either novel homo- or copolymers P of the novel monomers I with one another or novel copolymers P of the novel monomers I with other conventional comonomers. By means of these other conventional comonomers, mesogenic side groups which are known per se and which may also exhibit ferroelectric smectic liquid crystalline ($S_{c^*}$) behavior and/or side groups having dichroic chromophores can be introduced into the novel copolymers P.

Suitable novel homo- and copolymers P having chiral mesogenic side groups generally have a degree of polymerization of from 10 to 50, in particular from 10 to 40, preferably from 10 to 30.

Regarding the conventional and known comonomers and the conventional and known mesogenic side groups, reference may be made to DE-A-36 03 268 (EP-A-0 231 857), DE-A-36 03 267 (EP-A-0 231 858), EP-A-0 184 482, EP-A-0 228 703, DE-A-37 04 146, DE-A-35 00 838, U.S. Pat. No. 4,293,435, DE-A-34 29 438 and EP-A-0 171 045.

Preferred comonomers which are used for introducing side groups having dichroic chromophores into the novel copolymers P are those of the general formula XIV.

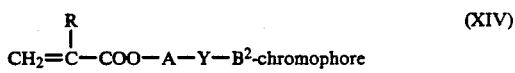

In this formula, R, A, Y and $B^2$ have the abovementioned meanings and chromophore is a dye radical. Here, A is preferably a group of the general formula V

where k has the abovementioned meanings. It is advantageous here if k is from 9 to 12, in particular 11, Y is an ether group and $B^2$ is a p-phenylene group. Particular advantages are obtained if the chromophore is an anthraquinone dye radical, the anthraquinone dye radical

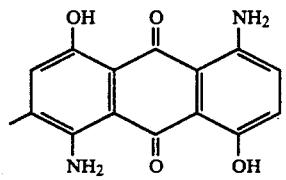

being very particularly advantageous. Comonomers XIV are disclosed in DE-A-36 31 841.

Other preferred comonomers which are used for introducing side groups having dichroic chromophores into the novel copolymers P are those of the general formula XV

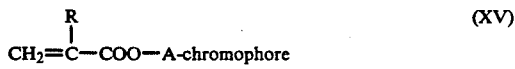

Here, R and A have the abovementioned meanings. Particular advantages are obtained if the chromophore is an anthraquinone dye radical, the anthraquinone dye radical

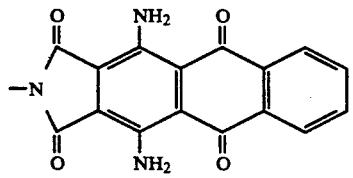

being very particularly advantageous. Comonomers XV having this anthraquinone dye radical can be prepared in a conventional manner, for example by reacting the free imido group of the anthraquinone dye with an ω-hydroxyalkyl bromide and subsequently esterifying the resulting N-(ω-hydroxyalkyl)-imide group with acrylic acid, methacrylic acid or α-chloroacrylic acid.

Examples of suitable novel homopolymers P having chiral mesogenic side groups are the novel homopolymers P1 to P484, each of which is formed from one of the novel monomers I-1 to I-484.

Examples of particularly suitable novel homopolymers P having chiral mesogenic side groups are the novel homopolymers P of the particularly suitable novel monomers I described in detail above.

Examples of very particularly suitable novel homopolymers P having chiral mesogenic side groups are the novel homopolymers P of the very particularly suitable novel monomers I-1, -111, -173, -175, -347, -347a, -347b, -349, -350, -351, -352, -353, -354, -461 and I-481, which accordingly are logically referred to as P1, P111, P115, P175, P347, P347a, P347b, P349, P350, P351, P352, P353, P354, P461 and P481.

Examples of suitable novel copolymers P having chiral mesogenic side groups are the novel copolymers P, each of which is formed from two or more of the novel monomers I-1 to I-484.

Examples of particularly suitable novel copolymers P having chiral mesogenic side groups are the novel copolymers P, each of which is formed from two or more of the particularly suitable novel monomers I described in detail above.

Examples of very particularly suitable novel copolymers P having chiral mesogenic side groups are the novel copolymers P, each of which is formed from two or more of the very particularly suitable novel monomers I-1, -111, -173, -175, -347, -347a, -347b, -349, -350, -351, -352, -353, -354, -461 and I-481.

Other examples of suitable novel copolymers P having chiral mesogenic side groups are the novel copolymers P which are formed from one or more of the novel monomers I-1 to I-484 and from one or more of the conventional and known comonomers.

Further examples of particularly suitable novel copolymers P having chiral mesogenic side groups are the novel copolymers P which are formed from one or more of the particularly suitable novel monomers I described in detail above and from one or more of the conventional and known comonomers.

Other examples of very particularly suitable novel copolymers P having chiral mesogenic side groups are the novel copolymers P which are formed from one or more of the very particularly suitable novel monomers I-1, -111, -173, -175, -347, -347a, -347b, -349, -351, -352, -353, -354, -481 and I-461 and one or more of the conventional and known comonomers.

Particular advantages are obtained if the other examples of suitable, particularly suitable and very particularly suitable novel copolymers P contain polymerized comonomers XIV and/or XV in addition to or instead of the conventional and known comonomers. Novel copolymers P of this type are preferred according to the invention.

In terms of the method, the preparation of the novel homo- and copolymers P has no special features but is carried out by the known methods conventionally used for thermal and/or free radical mass or solution (co)-polymerization.

The novel recording element contains, in addition to the novel recording layer (a) essential to the invention, further layers which are useful for its functioning.

Advantageous novel recording elements comprise
(b) a first dimensionally stable substrate which may furthermore be optically transparent,
(c) a first electrode layer which reflects laser light,
(d) a first orientation layer,
(a) the novel recording layer essential to the invention,
(e) a second orientation layer,
(f) an optically transparent second electrode layer and
(g) an optically transparent second dimensionally stable substrate.

With regard to this structure, the novel recording element is similar to the known laser-optical recording elements which can be repeatedly erased and recorded on and which are described in EP-A-0 205 187, GB-A-21 81 263, EP-A-0 271 900 or U.S. Pat. No. 4,752,820. These patents furthermore disclose examples of suitable first dimensionally stable substrates (b), first electrode layers (c) which reflect laser light, first orientation layers (d), second orientation layers (e), optically transparent second electrode layers (f) and optically transparent second dimensionally stable substrates (g).

In terms of the method, the production of the novel recording element has no special features but is carried out by the methods known from the prior art, as described, for example, in EP-A-0 205 187, GB-A-2 181 263, U.S. Pat. No. 4,752,820, EP-A-0 171 045, DE-A-37 04 146, DE-A-36 03 268 (EP-A-0 231 857), DE-A-36 03 267 (EP-A-0 231 858), EP-A-0 271 900 or DE-A-34 29 438.

It is known that, in the production of the novel recording element, it is necessary to ensure that the orientation layers (d) and (e) have a structure such that the chiral mesogenic side groups of the novel polymers P are oriented homeotropically in the novel recording layer (a), the longitudinal axis of their molecules being inclined with respect to the normals Z in the direction of the director n at an angle of tilt $\Theta$, as corresponds to a ferroelectric smectic liquid crystalline $S_c*$ phase.

If the novel recording element is in the form of a circular disk, it is particularly advantageous if the normal Z describes a concentric circular path around the midpoint of the disk, this also being referred to as tangential orientation The methods for structuring the orientation layers (d) and (e) are known and are disclosed in, for example, the abovementioned patents or in the publications by M. J. Bradshaw et al. in Liquid Crystals, 2 (1987), 107–110;

Mosley et al. in Displays, January 1987, pages 17–21;

D. Williams et al. in Journal of Physics, Part D: Applied Physics 19 (1986), L37–L41;

M. E. Becker et al. in Molecular Crystals and Liquid Crystals 132 (1986), 167–180;

J. S. Patel et al. in Ferroelectrics, 59 (1984), 137–144;

J. S. Patel et al. in J. Appl. Phys. 59 (1986), 2355–2360; and

J. M. Geary et al. in J. Appl. Phys. 62 (1987), 4100–4108.

The novel recording element is very suitable for repeated recording, reading and erasing of data.

It is known that the data are recorded in the ferroelectric smectic liquid crystalline ($S_c*$) recording layer (a) of a laser-optical recording element, which layer has a homogeneously planar orientation and an angle of tilt $\Theta$ of $+\alpha$ or $-\alpha$. The digital or analog data are recorded with the aid of a write laser beam of sufficient luminous power, if necessary with the application of an external electric field At the points where the write laser beam strikes, optically detectable, enantiotropic regions which are stable at room temperature are formed, the said regions being ferroelectric smectic liquid crystalline $S_{c^*}$ phases which have frozen in glassy form at room temperature and have an angle of tilt $\Theta$ of $-\alpha$ or $+\alpha$, smectic liquid crystalline $S_{A^*}$ phases, disordered microdomains (scattering centers) or isotropic I phases.

It is known that the recorded data or regions can then be detected with the aid of a read laser beam via the birefringence contrast, the dichroism contrast, the light scattering at scattering centers and/or the interference of reflected laser light waves of different phase velocities. It is proven to be advantageous if the light reflected by the relevant recording element is analyzed and converted into signals.

The recorded data or regions, in total or selectively, can then be erased by heating the data-containing recording layer (a) extensively or at points, in an external electric field.

Recording and reading of the data can then be repeated.

This method is particularly rapid and reliable when it is carried out with the aid of the novel recording element having the novel recording layer (a). Furthermore, the novel recording element proves to have a particularly long shelf life, so that there is no loss of recorded data even after prolonged storage. During recording, it proves to be particularly sensitive, so that on the one hand it is possible to use write lasers having a low luminous power and on the other hand the recording speed can be substantially increased compared with the prior art. During reading, the novel recording element has an extremely low background noise and gives particularly strong, well defined signals, resulting in a high signal/noise ratio.

Excellent results are obtained if the data are recorded in the novel recording layer (a) of the novel recording element in the form of optically detectable regions which are stable at room temperature and which are ferroelectric smectic liquid crystalline $S_{c^*}$ phases having the tilt angle $\Theta$ of $-\alpha$ or of $+\alpha$, opposite to the original tilt angle $\Theta$.

The method described above for repeated recording, reading and erasing of data can be carried out with the known apparatuses or disk drives. Apparatuses or disk drives which are suitable for the process under discussion are disclosed in, for example, EP-A-0 205 187.

There are further advantages if the disk drives described in DE-A-37 04 146 and having a rotatable laser-optical write and read head are used.

EXAMPLES

EXAMPLES 1 TO 13 AND COMPARATIVE EXPERIMENTS V1 TO V5 Preparation and characterization of the novel monomers I and of known monomers General preparation method:

The novel monomers I (Examples 1 to 13) and the known monomers (Comparative Experiments V1 to V5) were prepared from conventional and known starting materials, some of which are commercially available, by the synthesis methods described in the literature (cf. the scheme: Overview of Examples of advantageous synthesis).

The suitable synthesis building blocks XI, XII and XIII were first prepared, after which these building blocks were converted into the novel monomers I or the known monomers.

For this purpose, 42 mmol of synthesis building block XIII (carboxylic acid), 42 mmol of synthesis building block XI or XII (phenol), 42 mmol of dicyclohexylcarbodiimide and 2.5 mmol (N-pyrrolidinyl)-pyridine were added in succession to 250 ml of anhydrous methylene chloride or chloroform. The resulting mixture was stirred at room temperature until a conversion was complete, the progress of the reaction being monitored by thin layer chromatography.

After the end of the reaction, the resulting reaction mixture was cooled with ice The subsequently formed precipitate of dicyclohexylurea was filtered off, after which the solvent was evaporated.

The resulting, generally oily residue was purified by chromatography over silica gel, toluene, ethyl acetate, hexane, ethanol or mixtures thereof being used as the solvent and mobile phase.

The chromatographically purified residue was then recrystallized several times in a suitable solvent.

All novel monomers I (Examples 1 to 13) and known monomers (Comparative Experiments V1 to V5) prepared in this manner were characterized by elemental analysis and with the aid of $^1H$ nuclear resonance spectroscopy ($^1H$-NMR, 200 and 300 MHz, tetramethylsilane as internal standard, solvent $CDCl_3$). The composition of the monomers prepared, which was determined by elemental analysis, corresponded to the theoretical values.

Table 1 gives an overview of the compounds prepared and their $^1H$-NMR spectra.

In Table 1, the abbreviations have the following meanings:
H Hydrogen atoms
al aliphatic
ar aromatic
s singlet
d doublet
t triplet
q quartet
m multiplet.

TABLE 1

Novel monomers I (Examples 1 to 13) and known monomers (Comparative Experiments V1 to V5)

| Example | Designation | Structure (Monomer) | ¹H-NMR (δ in ppm) |
|---|---|---|---|
| 1 | I-1 | CH₂=CH—C(=O)—O—(CH₂)ₙ—O—[naphthalene]—O—C(=O)—[phenyl]—O—CH₂—CH(CH₃)—C₂H₅ <br> Recrystallized from ethanol | 0.77–2.01(m, al-H) <br> 3.91–4.35(m, 6H, OCH₂) <br> 5.81(d, 1H, CH₂=CH) <br> 6.03–6.20(m, 1H, CH₂=CH) <br> 6.40(d, 1H, CH₂=CH) <br> 6.99–8.62(m, 10 ar-H) |
| 2 | I-111 | CH₂=CH—C(=O)—O—(CH₂)ₙ—O—[phenyl]—O—C(=O)—[phenyl]—O—CH₂—CH(CH₃)—C₂H₅ <br> Recrystallized from ethanol | 0.91–2.00(m, al-H) <br> 3.80–4.20(m, 6H, OCH₂) <br> 5.83(d, 1H, CH₂=CH) <br> 6.21–6.33(m, 1H, CH₂=CH) <br> 6.41(d, 1H, CH₂=CH) <br> 7.00(d, 4 ar-H) <br> 7.29(s, 4 ar-H) <br> 8.17(d, 4 ar-H) |
| 3 | I-175 | CH₂=CH—C(=O)—O—(CH₂)ₙ—O—[phenyl]—[phenyl]—C(=O)—O—[phenyl]—CH(CH₃)—CH—C₂H₅ <br> Recrystallized from methanol | Solvent in this case CF₃COOD <br> 1.03–2.08(m, al-H) <br> 4.29–4.46(m, 6H, OCH₂) <br> 6.04(d, 1H CH₂=CH) <br> 6.20–6.32(m, 1H, CH₂=CH) <br> 6.56(d, 1H, CH₂=CH) <br> 7.22–8.36(m, 16 ar-H) |
| 4 | I-347 | CH₂=CH—C(=O)—O—(CH₂)ₙ—O—[phenyl]—[phenyl]—C(=O)—O—[bornyl] <br> Recrystallized from methanol | 0.93–2.77(m, al-H) <br> 4.05(t, 2H, OCH₂) <br> 4.15(t, 2H, OCH₂) <br> 5.24–5.37(m, 1H, OCH) <br> 5.83(d, 1H, CH₂=CH) <br> 6.05–6.19(m, 1H, CH₂=CH) <br> 6.40(d, 1H, CH₂=CH) <br> 7.00–8.29(m, 12 ar-H) |
| 5 | I-347a | CH₂=CH—C(=O)—O—(CH₂)ₙ—O—[phenyl]—[phenyl]—C(=O)—O—[bornyl] <br> Recrystallized from methanol | 1.00–2.77(m, al-H) <br> 4.05–4.46(t, 2H, OCH₂) <br> 4.15(t, 2H, OCH₂) <br> 5.27–5.37(m, 1H, OCH) <br> 5.83(d, 1H, CH₂=CH) <br> 6.07–6.19(m, 1H, CH₂=CH) <br> 6.41(d, 1H, CH₂=CH) <br> 7.03–8.29(m, 12 ar-H) |

TABLE 1-continued

Novel monomers I (Examples 1 to 13) and known monomers (Comparative Experiments V1 to V5)

| Example | Designation | Structure / Monomer | $^1$H-NMR (δ in ppm) |
|---|---|---|---|
| 6 | I-347b | CH$_2$=CH—C(=O)—O—(CH$_2$)$_6$—O—[biphenyl]—O—C(=O)—[phenyl]—O—C(=O)—O—[pinanyl]<br>Recrystallized from isopropanol | 0.90–2.81(m, al-H)<br>4.01(t, 2H, OCH$_2$)<br>4.19(t, 2H, OCH$_2$)<br>4.25–5.40(m, 1H, OCH)<br>5.75–5.90(m, 1H, CH$_2$=CH)<br>6.29–6.50(m, 1H, CH$_2$=CH)<br>6.90–8.40(m, 12 ar-H) |
| 7 | I-349 | CH$_2$=CH—C(=O)—O—(CH$_2$)$_n$—O—[biphenyl]—O—C(=O)—[phenyl]—O—C(=O)—O—[menthyl]<br>Recrystallized from isopropanol | 0.75–2.20(m, al-H)<br>4.04(t, 2H, OCH$_2$)<br>4.17(t, 2H, OCH$_2$)<br>4.85–5.05(m, 1H, OCH)<br>5.83(d, 1H, CH$_2$=CH)<br>6.05–6.20(m, 1H, CH$_2$=CH)<br>6.41(d, 1H, CH$_2$=CH)<br>6.98–8.31(m, 12 ar-H) |
| 8 | I-350 | CH$_2$=CH—C(=O)—O—(CH$_2$)$_n$—O—[biphenyl]—O—C(=O)—[phenyl]—O—C(=O)—CH(CH$_3$)—O—C(=O)—CH$_3$ | 1.07–1.93(m, al-H)<br>3.80(s, 3H, OCH$_3$)<br>3.95–4.28(m, 4H, OCH$_2$)<br>5.35(q, 1H, OCH)<br>5.72–5.88(m, 1H, CH$_2$=CH)<br>6.02–6.23(m, 1H, CH$_2$=CH)<br>6.32–6.50(m, 1H, CH$_2$=CH)<br>6.89–8.38(m, 12 ar-H) |
| 9 | I-351 | CH$_2$=CH—C(=O)—O—(CH$_2$)$_n$—O—[biphenyl]—O—C(=O)—[phenyl]—O—C(=O)—CH(CH$_3$)—O—C(=O)—C$_2$H$_5$ | 1.20–1.88(m, al-H)<br>3.91–4.32(m, 6H, OCH$_2$)<br>5.32(q, 1H, OCH)<br>5.81(d, 1H, CH$_2$=CH)<br>6.05–6.20(m, 1H, CH$_2$=CH)<br>6.40(d, 1H, CH$_2$=CH)<br>6.95–8.33(m, 12 ar-H) |
| 10 | I-352 | CH$_2$=CH—C(=O)—O—(CH$_2$)$_n$—O—[biphenyl]—O—C(=O)—[phenyl]—O—C(=O)—CH(CH$_3$)—O—C(=O)—CH(CH$_3$)—CH$_3$ | 0.90–1.92(m, al-H)<br>3.88–4.22(m, 4H, OCH$_2$)<br>4.98–5.19(m, 1H, OCH)<br>5.19–5.36(q, 1H, OCH)<br>5.72–5.90(m, 1H, CH$_2$=CH)<br>6.02–6.25(m, 1H, CH$_2$=CH)<br>6.31–6.51(m, 1H, CH$_2$=CH)<br>6.89–8.35(m, 12 ar-H) |

TABLE 1-continued

Novel monomers I (Examples 1 to 13) and known monomers (Comparative Experiments V1 to V5)

| Example | Designation | Monomer Structure | 1H-NMR (δ in ppm) |
|---|---|---|---|
| 11 | I-353 | [biphenyl diester with CH₂=CH—C(=O)—O—(CH₂)₁₁—O— on one side and —C(=O)—O—CH(CH₃)—CH₂—O—CH(CH₃)—CH₃ on the other] | 0.71–2.12(m, al-H); 3.90–4.20(m, 6H, OCH₂); 5.36(q, 1H, OCH); 5.72–5.87(m, 1H, CH₂=CH); 5.99–6.23(m, 1H, CH₂=CH); 6.31–6.50(m, 1H, CH₂=CH); 6.90–8.30(m, 12 ar-H) |
| 12 | I-354 | [biphenyl diester with CH₂=CH—C(=O)—O—(CH₂)₁₁—O— on one side and —C(=O)—O—CH(CH₃)—CH—C₂H₅ (with CH₃) on the other] | 0.89–1.86(m, al-H); 3.89–4.22 (m, 7H, OCH₂, OCH); 5.37(q, 1H, OCH); 5.82(d, 1H, CH₂=CH); 6.07–6.18(m, 1H, CH₂=CH); 6.33–6.45(d, 1H, CH₂=CH); 6.9–7.22(m, 12 ar-H) |
| 13 | I-461 | [CH₂=CH—C(=O)—O—(CH₂)₁₁—O—phenyl—C(=O)—O—menthyl] Recrystallized from isopropanol | 0.93–2.77(m, al-H); 4.05–4.46(t, 2H, OCH₂); 4.15(t, 3H, OCH₂); 5.22–5.35(m, 1H, OCH); 5.83(d, 1H, CH₂=CH); 6.05–6.19(m, 1H, CH₂=CH); 6.41(d, 1H, CH₂=CH); 6.98–8.02(m, 8 ar-H) |
| Comp. Exp. V1 | — | [CH₂=CH—C(=O)—O—(CH₂)₁₁—O—biphenyl—C(=O)—O—CH₂—CH(CH₃)—C₂H₅] Recrystallized from methanol | 1.02–2.07(m, al-H); 4.24–4.46(m, 6H, OCH₂); 6.05(d, 1H, CH₂=CH); 6.20–6.32(m, 1H, CH₂=CH); 6.57(d, 1H, CH₂=CH); 7.18–8.17(m, 12 ar-H) |
| V2 | — | [phenyl—O—phenyl—C(=O)—O—CH₂—CH(CH₃)—C₂H₅] Recrystallized from methanol | 0.95–1.93(m, al-H); 4.00–4.27(m, 6H, OCH₂); 5.83(d, 1H, CH₂=CH); 6.07–6.20(m, 1H, CH₂=CH); 6.41(d, 1H, CH₂=CH); 6.98–8.20(m, 8 ar-H) |
| V3 | — | [CH₂=CH—C(=O)—O—(CH₂)₁₁—O—biphenyl—C(=O)—O—CH₂—CH(CH₃)—C₂H₅] Recrystallized from isopropanol | 0.80–2.00(m, al-H); 3.80–4.30(m, 6H, OCH₂); 5.81(d, 1H, CH₂=CH); 6.40(d, 1H, CH₂=CH); 6.00–6.20(m, 1H, CH₂=CH); 6.89–8.29(m, 12 ar-H) |

TABLE 1-continued

Novel monomers I (Examples 1 to 13) and known monomers (Comparative Experiments V1 to V5)

| Example | Designation | Structure | Monomer | $^1$H-NMR ($\delta$ in ppm) |
|---|---|---|---|---|
| V4 | — | $CH_2=CH-\overset{O}{\underset{\|}{C}}-O-(CH_2)_8-O-\bigcirc\!\!-\!\!\bigcirc-\overset{O}{\underset{\|}{C}}-O-CH_2-\overset{CH_3}{\underset{\|}{\overset{*}{C}H}}-C_2H_5$<br>Recrystallized from methanol | | 0.80–2.00(m, al-H)<br>4.00–4.31(m, 6H, OCH$_2$)<br>5.83(d, 1H, CH$_2$=CH)<br>6.07–6.20(m, 1H, CH$_2$=CH)<br>6.43(d, 1H, CH$_2$=CH)<br>6.95–8.27(m, 12 ar-H) |
| V5 | — | $CH_2=CH-\overset{O}{\underset{\|}{C}}-O-(CH_2)_{11}-O-\bigcirc\!\!-\!\!\bigcirc-\overset{O}{\underset{\|}{C}}-O-\overset{CH_3}{\underset{\|}{\overset{*}{C}H}}-(CH_2)_5CH_3$<br>Recrystallized from isopropanol | | 0.80–1.88(m, al-H)<br>4.10(t, 2H, OCH$_2$)<br>4.15(t, 2H, OCH$_2$)<br>5.16(q, 1H, OCH)<br>5.83(d, 1H, CH$_2$=CH)<br>6.04–6.20(m, 1H, CH$_2$=CH)<br>6.41(d, 1H, CH$_2$=CH)<br>7.00–8.31(m, 12 ar-H) |

EXAMPLES 14 TO 34 AND COMPARATIVE EXPERIMENTS V6 TO V11 The preparation and characterization of novel homo- and copolymers P and of known homo- and copolymers General experimental method:

For (co)polymerization, one or more novel monomers I with or without one or more known comonomers (Examples 14 to 34) and in each case a known monomer (Comparative Experiments V6 to V9) were dissolved in shaking vessels, together with azobisisobutyronitrile, in absolute tetrahydrofuran, toluene, dioxane or dimethylformamide while passing in argon. After argon had been passed in for a further 10 minutes, the monomer solutions were thermostated at 50° C. After the end of the (co)polymerization, the (co)polymers were separated from the monomers by exclusion chromatography over Sephadex LH 20, tetrahydrofuran by being used as the solvent and mobile base. The (co)polymers purified in this manner were reprecipitated several times from tetrahydrofuran by adding methanol or petroleum ether, isolated and then dried under greatly reduced pressure.

The composition of the resulting co(polymers) was determined by elemental analysis The values obtained agreed well with the theoretical values in all cases.

The composition of the copolymers having side groups containing dichroic chromophores was furthermore determined by spectroscopy using UV light and visible light.

The remaining (co)polymers were characterized by $^1$H-NMR spectrosocpy in CDCl$_3$ using tetramethylsilane as the internal standard.

For identification of the liquid crystalline phases and for determination of the phase transition temperatures, the conventional and known X-ray diffraction methods, the polarization microscopy methods and the calorimetric methods of differential thermal analysis (DTA) and differential scanning calorimetry (DSC) were used.

Table 2 gives an overview of the structures of the (co)polymers prepared and summarizes the results of the measurements made on the said (co)polymers. Furthermore, the solvents in which the (co)polymerization was carried out and, where relevant, the ratio of novel monomer I to known comonomer are stated.

In Table 2, the abbreviations have the following meanings:
H Hydrogen atom
al aliphatic
ar aromatic
q quartet
m multiplet
G Glass stage
I Isotropic phase
N* cholesteric phase
S$_A$ smectic A phase
S$_{c^*}$ smectic C* phase
NNI not yet identified
THF tetrahydrofuran
DMF dimethylformamide
VIS visible light

TABLE 2

Novel homo- and copolymers P (Examples 14 to 34) and known polymers
(Comparative Experiments V6 to V9)

| Example | Novel monomer I used Designation | (Co)polymer Structure (Solvent for the (co)polymerization) [Phase transition behavior (°C.)] | ¹H-NMR (δ in ppm) or UV/VIS spectroscopy |
|---|---|---|---|
| 14 | I-1, P1 | ...(–CH₂–CH–)–C(=O)–O–(CH₂)₁₁–O–[phenyl]–C(=O)–O–[naphthyl]–C(=O)–O–CH₂–CH(CH₃)–*C₂H₅ (Toluene) [G 50 S<sub>C</sub>* 55 S<sub>A</sub> 97 I] | 0.80–2.39 (m, al-H) 3.79–4.35 (m, 6H, OCH₂) 6.98–8.61 (m, 10 ar-H) |
| 15 | I-111, P111 | ...(–CH₂–CH–)–C(=O)–O–(CH₂)₁₁–O–[phenyl]–C(=O)–O–[phenyl]–O–C(=O)–[phenyl]–O–*CH(CH₃)–CH₂–C₂H₅ (THF) [G 50 NN I 133 N* 170 I] | 0.80–2.40 (m, al-H) 3.60–4.16 (m, 6H, OCH₂) 6.90–8.25 (m, 12 ar-H) |
| 16 | I-175, P175 | ...(–CH₂–CH–)–C(=O)–O–(CH₂)₁₁–O–[phenyl]–[phenyl]–O–C(=O)–[phenyl]–C(=O)–O–CH₂–*CH(CH₃)–CH₂–C₂H₅ (THF) | 0.93–2.55 (m, al-H) 3.71–4.32 (m, 6H, OCH₂) 6.97–8.33 (m, 16 ar-H) |
| 17 | I-347, P347 | ...(–CH₂–CH–)–C(=O)–O–(CH₂)₁₁–O–[phenyl]–[phenyl]–O–C(=O)–[phenyl]–C(=O)–O–[menthyl] (THF) [G 50 S<sub>B</sub> 122 S<sub>C</sub>* 138 S<sub>A</sub> 160 I] | 1.00–2.80 (m, al-H) 3.80–4.15 (m, 4H, OCH₂) 5.28–5.36 (m, 1H, OCH) 6.95–8.27 (m, 12 ar-H) |
| 18 | I-354, P354 | ...(–CH₂–CH–)–C(=O)–O–(CH₂)₁₁–O–[phenyl]–[phenyl]–O–C(=O)–[phenyl]–C(=O)–O–*CH(CH₃)–O–C(=O)–*CH(CH₃)–CH₂–C₂H₅ (THF) [G 50 S<sub>C</sub>* 105 S<sub>A</sub> 130 I] | 0.89–2.2 (m, al-H) 3.68–4.15 (m, 7H, OCH, OCH₂) 5.36 (q, 1H, OCH) 6.96–8.27 (m, 12 ar-H) |

TABLE 2-continued

Novel homo- and copolymers P (Examples 14 to 34) and known polymers
(Comparative Experiments V6 to V9)

| Example | Novel monomer I used Designation | (Co)polymer Structure (Solvent for the (co)polymerization) [Phase transition behavior (°C.)] | ¹H-NMR (δ in ppm) or UV/VIS spectroscopy |
|---|---|---|---|
| 19 | I-351, P351 | (DMF) | 1.00–2.10 (m, al-H) 3.80–4.29 (m, 6H, OCH₂) 5.32 (q, 1H, OCH), 6.90–8.25 (m, 12 ar-H) |
| 20 | I-461, P461 | (THF) | 0.96–2.77 (m, al-H) 3.95–4.12 (m, 4H, OCH₂) 5.22–5.38 (m, 1H, OCH) 6.90–8.20 (m, 8 ar-H) |
| 21 | I-350, P350 | (DMF) | 0.90–2.05 (m, 7H, OCH₂, OCH₃) 3.70–4.20 (m, 7H, OCH₂, OCH₃) 5.20–5.45 (m, 1H, OCH) 6.80–8.40 (m, 12 ar-H) |
| 22 | I-347b, P347b | | 0.80–2.84 (m, al-H) 3.83–4.20 (m, 7H, OCH₂) 5.25–5.35 (m, 1H, OCH) 6.83–8.31 (m, 12 ar-H) |
| 23 | I-352b, P352b | (DMF) | 1.05–1.95 (m, al-H) 3.80–4.25 (m, 4H, OCH₂) 5.00–5.40 (m, 2H, OCH) 6.80–8.31 (m, 12 ar-H) |
| 24 | I-353, P353 | (DMF) | 0.80–2.10 (m, al-H) 3.80–4.30 (m, 6H, OCH₂) 5.25–5.45 (m, 1H, OCH) 6.80–8.40 (m, 12 ar-H) |

TABLE 2-continued

Novel homo- and copolymers P (Examples 14 to 34) and known polymers
(Comparative Experiments V6 to V9)

| Example | Novel monomer I used Designation | (Co)polymer Structure (Solvent for the (co)polymerization) [Phase transition behavior (°C.)] | $^1$H-NMR (δ in ppm) or UV/VIS spectroscopy |
|---|---|---|---|
| 25 | I-347 / V1 | 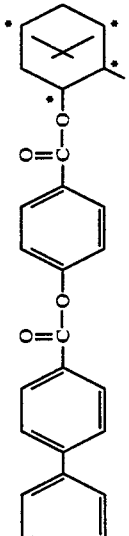 Molar ratio 1:1 (THF) [G 60 NNI 135 S$_C$* 155 S$_A$ 184 I] | 0.80–2.80 (m, al-H) 3.70–4.30 (m, OCH$_2$) 5.25–5.35 (m, OCH) 6.80–8.31 (m, ar-H) |
| 26 | I-111 / I-347 / V1 | 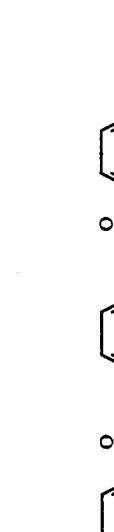 monomer ratio 1:1:1 (THF) [G 50 S$_B$* 118 S$_C$* 147 S$_A$ 172 I] | 0.80–2.80 (m, al-H) 3.60–4.28 (m, OCH$_2$) 5.24–5.35 (m, OCH) 6.95–8.28 (m, ar-H) |
| 27 | I-111 / V1 | 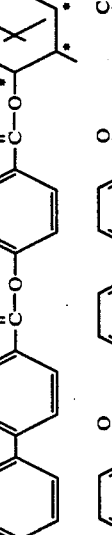 Molar ratio 1:1 | 0.80–2.40 (m, al-H) 3.60–4.29 (m, OCH$_2$) 6.95–8.24 (m, ar-H) |

TABLE 2-continued

Novel homo- and copolymers P (Examples 14 to 34) and known polymers
(Comparative Experiments V6 to V9)

| Example | Novel monomer I used Designation | (Co)polymer Structure (Solvent for the (co)polymerization) [Phase transition behavior (°C.)] | $^1$H-NMR (δ in ppm) or UV/VIS spectroscopy |
|---|---|---|---|
| 28 | I-111 | (THF) [G 50 S$_C$* 100 S$_A$ 135 N* 159 I] 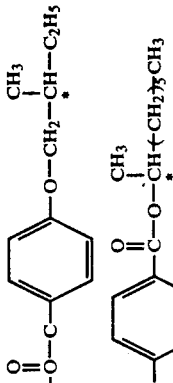 | 0.86–2.40 (m, al-H) 3.79–4.13 (m, OCH$_2$) 5.10–5.22 (m, OCH) 6.95–8.27 (m, ar-H) |
| | V5 | Molar ratio 1:1 (THF) | |
| 29 | I-354 | 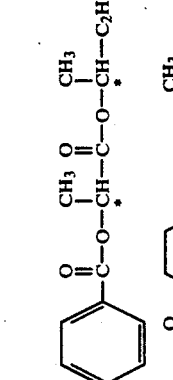 | 0.93–2.31 (m, al-H) 3.80–4.15 (m, OCH$_2$) 5.33–5.40 (q, OCH) 6.90–8.24 (m, ar-H) |
| | I-111 | Molar ratio 1:1 (THF) | |
| 30 | I-351 | 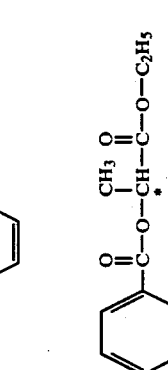 | 0.96–2.10 (m, al-H) 3.83–4.27 (m, OCH$_2$) 5.28–5.38 (q, OCH) 6.96–8.24 (m, ar-H) |
| | I-111 | Molar ratio 1:1 (DMF) | |
| 31 | I-111 | 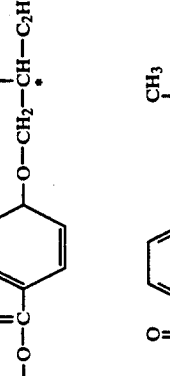 | UV/VIS: λ$_{max}$ (CH$_2$Cl$_2$) = 633 nm Content of dichroic side groups: 10% by weight |

TABLE 2-continued

Novel homo- and copolymers P (Examples 14 to 34) and known polymers
(Comparative Experiments V6 to V9)

| Example | Novel monomer I used Designation | (Co)polymer Structure (Solvent for the (co)polymerization) [Phase transition behavior (°C.)] | $^1$H-NMR ($\delta$ in ppm) or UV/VIS spectroscopy |
|---|---|---|---|
| known conomer with chromophor | V1 | 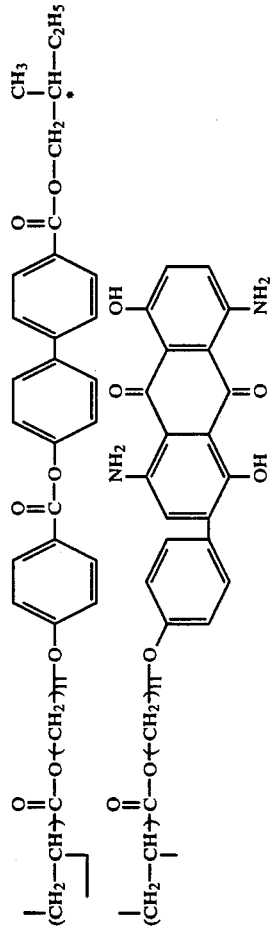Molar ratio I-111:V1 1:1; dye comonomer: 10 % by weight (THF) | |
| 32 | I-347 | 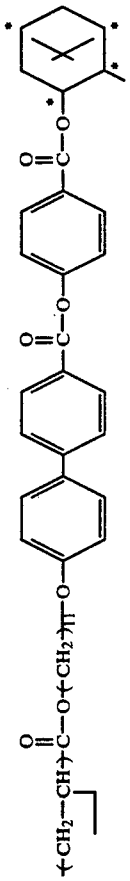 | 0.85-2.81 (m, al-H) 3.80-4.19 (m, OCH$_2$) 5.20-5.42 (m, 1H, OCH) 6.74-8.32 (m, ar-H) |
| known conomer with chromophor | | | UV/VIS: $\lambda_{max}$(CH$_2$Cl)$_2$ = 624 nm Content of dichroic side groups: 10% by weight |
| 33 | I-352 | 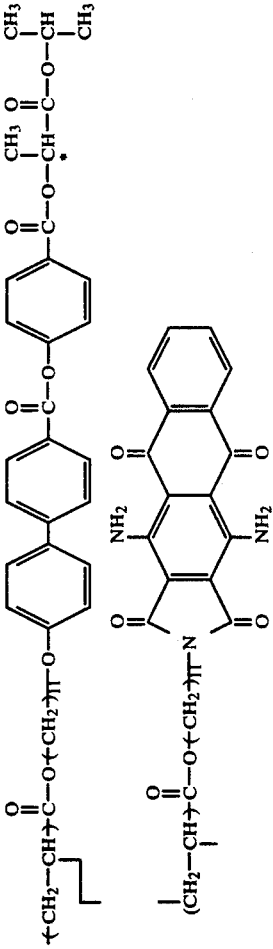(DMF) | UV/VIS: $\lambda_{max}$(CH$_2$Cl$_2$) = 671 nm Content of dichroic side groups: 10% by weight |

TABLE 2-continued

Novel homo- and copolymers P (Examples 14 to 34) and known polymers
(Comparative Experiments V6 to V9)

| Example | Novel monomer I used Designation | (Co)polymer Structure (Solvent for the (co)polymerization) [Phase transition behavior (°C.)] | $^1$H-NMR (δ in ppm) or UV/VIS spectroscopy |
|---|---|---|---|
| 34 | I-347 / I-349 | ...–(CH$_2$–CH)–C(=O)–O–(CH$_2$)$_{11}$–O–[biphenyl]–C(=O)–O–[pinanyl*] (THF) Molar ratio I-347:I-349 = 1:1 ...–(CH$_2$–CH)–C(=O)–O–(CH$_2$)$_{11}$–O–[biphenyl]–C(=O)–O–[menthyl*] (Toluene) [G 50 S$_C$* 138 S$_A$ 206 I] | 0.70–2.80 (m, al-H) 3.80–4.20 (m, OCH$_2$) 4.90–5.00 (m, OCH) 6.85–8.40 (m, ar-H) |
| Comparative Experiment V6 | V1 | ...–(CH$_2$–CH)–C(=O)–O–CH$_2$–CH*(CH$_3$)–C$_2$H$_5$ with biphenyl benzoate mesogen (THF) | 0.90–1.90 (m, al-H) 3.90–4.30 (m, 6H, OCH$_2$) 6.98–8.15 (m, 12 ar-H) |
| V7 | V3 | ...–(CH$_2$–CH)–C(=O)–O–CH$_2$–CH*(CH$_3$)–C$_2$H$_5$ with biphenyl benzoate mesogen (THF) | 0.80–2.40 (m, al-H) 3.69–4.26 (m, 6H, OCH$_2$) 7.00–8.29 (m, 12 ar-H) |
| V8 | V5 | ...–(CH$_2$–CH)–C(=O)–O–CH(CH$_3$)–(CH$_2$)$_5$CH$_3$ with biphenyl benzoate mesogen (THF) | 0.88–1.93 (m, al-H) 3.95–4.15 (m, 4H, OCH$_2$) 5.11–5.20 (m, 1H, OCH) 6.99–8.26 (m, 12 ar-H) |
| V9 | V4 | ...–(CH$_2$–CH)–C(=O)–O–CH$_2$–CH*(CH$_3$)–C$_2$H$_5$ with biphenyl benzoate mesogen (THF) | 0.95–2.57 (m, al-H), 3.69–4.29 (m, 6H, OCH$_2$) 6.95–8.20 (m, 12 ar-H) |

As shown in Table 2, the novel homo- and copolymers having chiral mesogenic side groups can be just as easily prepared as those known from the prior art No additional technical measures therefore have to be taken for their preparation. This gives rise to an additional incentive to replace the known homopolymers with the novel homo- and copolymers P, in order to make available their particular advantageous performance characteristics.

For example, the known homopolymers give rise to no $S_c*$ phase or only to a monotropic $S_c*$ phase which is obtainable only on cooling the known homopolymers. In this context, reference may furthermore be made, for comparative purposes, to Example 14, page 64, or Example 24, page 66, of EP-A-0 228 703, which are included here as Comparative Experiments V10 and V11.

In the case of the known homopolymers too, the N* phase, which is important from the point of view of performance characteristics because it simplifies the orientation of the chiral mesogenic side groups, is frequently absent.

Furthermore, the known homopolymers do not exhibit the phase transition behavior as is desirable or necessary, for example, for their use in the recording layers (a) of laser-optical recording elements.

Moreover, the response time $\tau$ required for laser-optical data recording is too long in the case of the known homopolymers. Here too, reference may be made, for example, to Comparative Experiments V10 and V11 (Examples 14 and 24 of EP-A-0 228 703), which disclose response times $\tau$ of 0.02 s or 0.05 s, which however is still too high by a factor of $10^2$.

EXAMPLES 35 AND 40

The production of novel recording elements and their use for repeated recording, writing and erasing of digital data
General experimental method:

First a 0.7 μm thick, conductive, transparent electrode layer of indium tin oxide (ITO, $R=30$ $\Omega/\square$) and then a 0.25 μm thick $SiO_2$ layer were applied in a conventional and known manner by sputtering to a flat glass sheet (BK7) measuring $40\times30\times3$ mm.

The $SiO_2$ layer and the ITO layer were etched imagewise by the photoresist method, so that a relief structure having a square ITO electrode and the appropriate current supply resulted. The photoresist used here was the negative resist Nylotron® WV 0138 X from BASF AG. Etching was effected with the aid of an etching solution of 268 g of $FeCl_2.4H_2O$, 24 g of $SnCl_2.2H_2O$, 450 ml of 37% strength HCl and 415 ml of water. The remaining photoresist was stripped using 3% strength aqueous potassium hydroxide solution.

Thereafter, an orientation layer of rubbed polyimide was applied to the surface of the resulting arrangement by spin-coating with a 3% strength solution of a polyimide precursor (Liquicoat® ZLI 2650 from Merck AG), drying the resulting wet layer, baking the polyimide precursor layer for 4 hours at 300° C. and rubbing the resulting polyimide layer with a velour cloth.

For the production of the novel recording element, from 5 to 10 mg of a novel homopolymer P or of a novel copolymer P having chiral mesogenic side groups were applied to the surface of the orientation layer, in the region of the square ITO electrode. For this purpose, the arrangement comprising the flat glass sheet, the ITO electrode relief and the orientation layer were heated to 10° above the clear point of the relevant novel (co)-polymer P.

Thereafter, the region around the ITO electrode relief was covered with a polyimide spacer film resistant to high temperatures, and the entire resulting arrangement comprising the flat glass sheet, the ITO electrode relief, the orientation layer, the molten novel (co)polymer P and the spacer film was covered with a second coincident arrangement which comprised the flat glass sheet, the ITO electrode relief and the orientation layer and was heated to 10° C. above the clear point of the relevant novel (co)polymer P, so that a parallel plate capacitor resulted, in which the molten novel (co)polymer P was enclosed.

This sandwich arrangement was pressed for up to 2 hours in a mechanical film press at 10° C. above the clear point of the relevant novel (co)polymer P, so that the resulting novel recording element had a 0.1, 2, 6, 10 or 50 μm thick novel recording layer (a), depending on the thickness of the spacer film.

The response times $\tau$ of the novel recording element were determined from the change in its optical polarization properties with time on changing the applied d.c. voltage from $+U(V)$ to $-U(V)$.

For this purpose, the change in the transmission of an HeNe laser beam ($\lambda=633$ nm) with time was measured when the novel recording layer (a) was located between two crossed polarizers, the axis of the angle of tilt $\Theta$ of the relevant novel (co)polymer P being at an angle of 45° with respect to the polarizers before the switching process [applied voltage $+U(V)$], which ensured the maximum transmittance of the novel recording layer (a).

The response time $\tau$ was determined as the time in which the transmission of the laser beam passing through the novel recording layer (a) changed from 90% of the transmission contrast to 10% of this contrast after the switching process from $+U(V)$ to $-U(V)$.

The angle of tilt $\Theta$ of the relevant novel (co)-polymer P in the novel recording layer (a) was measured in a conventional and known manner at a temperature $T_c-5$ K, by measuring the switching angle $2\Theta$ by polarization microscopy. Here, $T_c$ is the phase transition temperature for the transition between the $S_c*$ phase to the subsequent high temperature phase.

The pitch G was measured as described by S. Rozanski in Physicus Status Solidi (a), 79 (1983), 309. For this purpose, 50 μm thick novel recording layers (a) were always used, and the measurements were carried out in the temperature range of the relevant $S_c*$ phase.

For the determination of the ferroelectric spontaneous polarization $P_s$ or of the dipole density or of the sum of the oriented dipole moments per unit volume of the recording layer (a), the conventional and known delta method was used. For this purpose, a periodic delta voltage having a frequency of 20 Hz and a peak voltage of $\pm20$, $\pm60$, $\pm62$ and $\pm70$ V was applied to the ITO electrodes of the novel recording element and at the same time the current flowing through the novel recording element was recorded as a function of time. From the measured values for the total current I (t), the capacitive current and the ohmic current, the spontaneous polarization current was then determined, and the ferroelectric spontaneous polarization $P_s$ ($nC/cm^2$) was calculated from this. Apart from in Example 35, the measurements were carried out on 10 μm thick novel recording layers (a) at a temperature of $T_c-5$ K.

EXAMPLE 35

For Example 35, the novel homopolymer P347 of Example 17, prepared from the novel monomer I-347, was used.

A 0.1 μm thick novel recording layer (a) consisting of this had, in its $S_{c*}$ order state, at 126° C., an angle of tilt $\Theta$ of $\alpha=\pm 20.5°$ and a spontaneous ferroelectric polarization $P_s$ of 29.9 nC/cm². At 137° C., i.e. 1° C. below the phase transition $S_{c*} \rightleftarrows S_A$, its response time $\tau$ at a voltage change from +18 V to −18 V was 45 μs.

The novel recording layer (a) could therefore readily be switched back and forth between two thermodynamically stable $S_{c*}$ order states, over its entire area or at points, by applying a d c. voltage within the temperature range of its $S_{c*}$ phase. The novel recording element was therefore very suitable for repeated recording, reading and erasing of data with the aid of laser beams.

EXAMPLE 36

For Example 36, the novel copolymer P of Example 26, prepared from the novel monomers I-111 and I-347 and from the known comonomer V1, was used. The 0.1 μm thick novel recording layer (a) consisting of this had a response time $\tau$ of 101 μs at 136° C. for a voltage change from +18 V to −18 V and could likewise be readily switched back and forth between two thermodynamically stable states, over its entire area or at points. The novel recording element was therefore likewise very suitable for repeated recording, reading and erasing of data with the aid of laser beams. In addition, the pitch G was measured for a 50 μm thick novel recording layer (a) and was g>10 μm.

The angle of tilt $\Theta$ was determined for a 10 μm thick novel recording layer (a) and was $\Theta=12.6°$.

The spontaneous polarization $P_s$ was likewise measured for the 10 μm thick novel recording layer (a) and was $P_s=6.0/cm^2$.

EXAMPLES 37 TO 40

For Example 37, the novel copolymer P of Example 25, prepared from the novel monomer I-347 and the known comonomer V1, was used.

For Example 38, the novel copolymer P of Example 27, prepared from the novel monomer I-111 and the known comonomer V1, was used.

For Example 39, the novel copolymer P of Example 28, prepared from the novel monomer I-111 and the known comonomer V5, was used.

For Example 40, the novel copolymer P of Example 29, prepared from the novel monomers I-354 and I-111, was used.

Table 3 gives an overview of the particular thickness of the novel recording layers (a) prepared from these novel copolymers P, and of the measurements obtained for these novel recording layers (a).

The measurements summarized in Table 3 underline the fact that the novel recording elements of Examples 37 to 40 are very suitable for repeated recording, reading and erasing of data by means of laser beams, i.e. for reversible laser-optical data recording.

TABLE 3

The performance characteristics of the novel recording layers (a) of the novel recording elements of Examples 37 to 40

| Example No. | Pitch G (μm) | Angle of tilt θ (degrees) | Spontaneous polarization Ps at a voltage ± U (nC/cm²; ± V) | Response time τ at a voltage ± U and a thickness d of (a) (μs; ± V; μm) |
|---|---|---|---|---|
| 37 | 2.8 | 14.0 | 10.5; ± 60 | 177; ± 60; 6 |
| 38 | >10 | 12.5 | Not measured | 280; ± 40; 2 |
| 39 | 1.8 | 19.0 | 17.6; ± 60 | 135; ± 20; 2 |
| 40 | 5.0 | 15.0 | 7.9; ± 70 | 42; ± 20; 2 |

We claim:
1. A laser-optical recording element which can be repeatedly erased and recorded on, containing
a) a recording layer having a thickness (d) which exhibits enantiotropic, ferroelectric smectic liquid crystalline ($S_{c*}$) behavior and can be switched back and forth between two thermodynamically stable, optically distinguishable ferroelectric smectic liquid crystalline $S_{c*}$ order states on exposure to a laser beam of sufficient luminous power by applying an external electric field,
the said recording layer (a) containing at least one polymer I having chiral mesogenic pendant side groups exhibiting ferroelectric smectic liquid crystalline behavior and comprising monomer units derived from monomers of the structure I

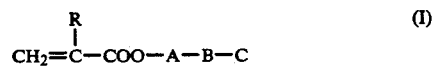

where
R is hydrogen, chlorine or methyl,
A is a flexible space-maintaining long-chain molecular moiety having the formula —(CH₂—)$_R$— where R is an integer of from 1 to 30,
C is an optically active chiral molecular moiety and B is a mesogenic molecular moiety which consists of three or more aromatic nuclei bonded linearly or virtually linearly to one another and which is selected from the group consisting of
i) moieties B which contain one or more napth-2,6-ylene groups,
ii) moieties B of the formula II

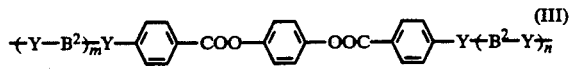

where
B² is a p-phenylene, a biphenyl-4-4'-diyl or a napth-2,6-ylene group,
Y is an ether, an ester, a thioester group or a carbon-carbon single bond and
m and n are each 0 or an integer ≧1;
iii) moieties B of the formula IV

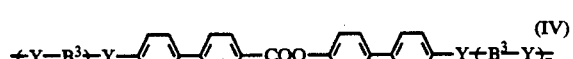

where m and n and Y have the abovementioned meanings and B³ is selected from the group consisting of the p-phenylene, the biphenyl-4-4'-diyl and the napth-2,6-ylene group and the group III-1

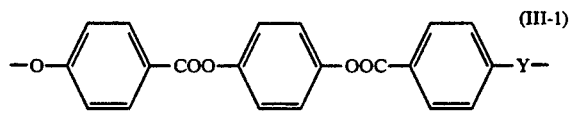

where Y has the abovementioned meanings; and iv) moieties B, selected from the group consisting of the groups X-1 to X-4

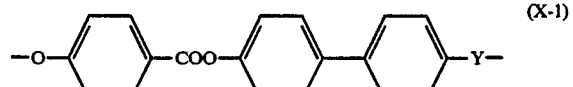

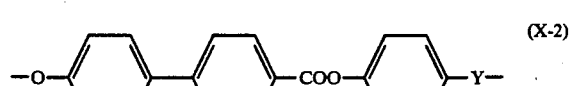

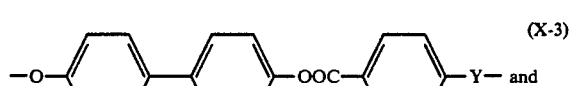

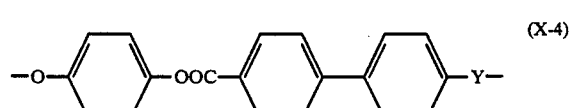

where Y has the abovementioned meanings and the groups X-1 to X-4 are bonded via the ether group to moiety A, with the proviso that the moiety C of the molecule is exclusively selected from the group consisting of the pinan-3-yl, the camphan-2-yl and the p-methan-3-yl group and the group of the formula VII

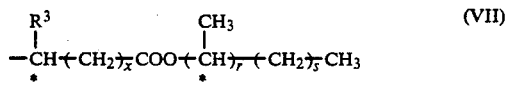

where $R^3$ is methyl or trifluoromethyl, x and r independently of one another are each 0 or 1 and s is an integer from 1 to 3, the group of the formula VIII

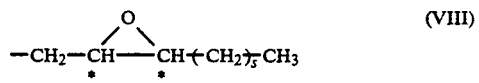

where s has the abovementioned meaning, and the group of the formula IX

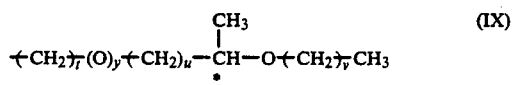

where t, u and v independently of one another are each an integer of from 1 to 10, t and u independently of one another may furthermore be 0, and y is 0 or 1, whenever one of the said groups X-1 to X-4 is selected for moiety B of the molecule.

2. A laser-optical recording element as claimed in claim 1, wherein the said moiety B of the molecule which comprises one or more napth-2,6-ylene group is a group of the structure II

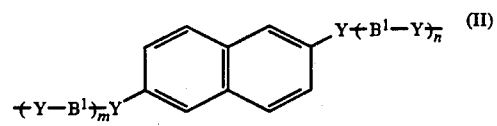

where
$B^1$ is a p-phenylene and/or a biphenyl-4,4'-diyl group,
Y is an ether, an ester, a thioester group or a carbon-carbon single bond and
m and n are each 0 or an integer $\geq 1$, with the proviso that n may not be 0 when m is 0.

3. A laser-optical recording element as claimed in claim 2, wherein the said moiety B of the molecule which comprises at least one napth-2,6-ylene group is selected from the groups II-1 to II-3

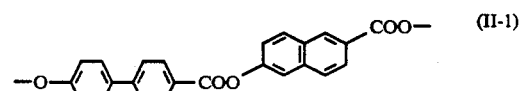

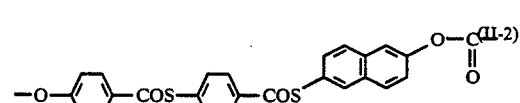

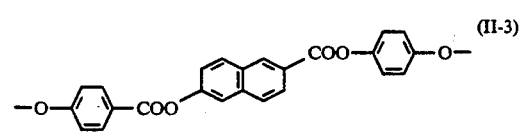

4. A laser-optical recording element as claimed in claim 1, wherein the group III-1

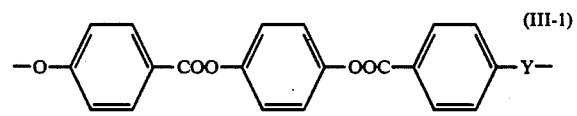

where Y has the above mentioned meanings, is used as the said moiety B of the structure III.

5. A laser-optical recording element as claimed in claim 1, wherein the group IV-1

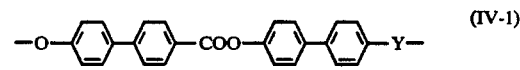

where Y has the abovementioned meanings, is used as the said moiety B of the structure IV.

6. A laser-optical recording element as claimed in claim 3, wherein the group II-1 to II-3 is bonded to the said moiety A of the molecule via the ether group.

7. A laser-optical recording element as claimed in claim 4, wherein the group III-1 is bonded to the said moiety A of the molecule via the ether group.

8. A laser-optical recording element as claimed in claim 5, wherein the group IV-1 is bonded to the said moiety A of the molecule via the ether group.

9. A laser-optical recording element as claimed in claim 1, wherein the molecular moiety C is a group of the formula VI

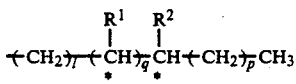

where
R¹ is halogen,
R² is methyl, cyano or halogen,
l is 0 or an integer of from 1 to 10,
q is 0 or 1 and
p is 0 or an integer of from 1 to 10, with the proviso that p may not be 0 when R² is methyl.

10. A laser-optical recording element as claimed in claim 1, wherein the molecular moiety C is a pinan-3-yl, camphan-2-yl or p-menthan-3-yl group.

11. A laser optical recording element as claimed in claim 1, wherein the molecular moiety C is a group of the formula VII

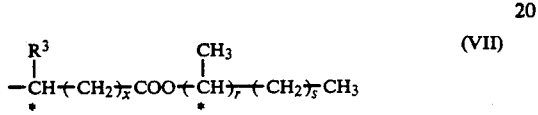

where R³ is methyl or trifluoromethyl, r and x independently of one another are each 0 or 1 and s is an integer of from 1 to 3.

12. A laser-optical recording element as claimed in claim 1, wherein the molecular moiety C is a group of the formula VIII

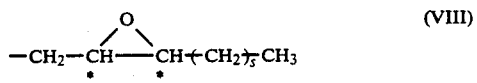

where s has the abovementioned meanings.

13. A laser-optical recording element as claimed in claim 1, wherein the molecular moiety C is a group of the formula IX

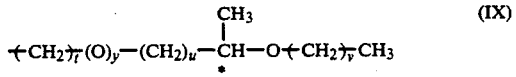

where t, u and v independently of one another are each an integer of from 1 to 10, t and u independently of one another may furthermore be 0, and y is 0 or 1.

14. A laser-optical recording element as claimed in claim 1, additionally containing pendant side groups exhibiting liquid crystalline behavior.

15. A laser-optical recording element as claimed in claim 1, further comprising pendant side groups containing chromophores.

16. A laser-optical recording element as claimed in claim 14, further comprising pendant side groups containing chromophores.

17. A laser-optical recording element as claimed in a claim 1, being in the form of a laser-optical data disk.

18. A laser-optical recording element as claimed in claim 1, wherein the thickness d of the recording layer (a) is from 0.1 to 5 μm.

19. The laser-optical recording element as claimed in claim 1, wherein the recording element exhibits a response time τ required for switching the recording layer (a) from one thermodynamically stable, ferroelectric smectic liquid crystalline $S_{c^*}$ order state to the other, and such response time is less than 1 ms at above room temperature.

20. A laser-optical recording element as claimed in claim 19, wherein the switching time τ at a temperature which is 1° C. below the phase transition $S_{c^*} \rightarrow S_{A^*}$ is less than 100 μs.

21. A method for repeated recording, reading, and erasing of data, comprising the steps of
(1) recording digital or analog data with the aid of a write laser beam of sufficient luminous power, if necessary with the application of an external electric field, in the ferroelectric smectic liquid crystalline ($S_{c^*}$) recording layer (a) having a thickness (d) of a laser-optical recording element in the form of optically detectable regions which are stable at room temperature and which are ferroelectric smectic liquid crystalline $S_{c^*}$ phases, smectic liquid crystalline $S_{A^*}$ phases, disordered microdomains (scattering centers) or isotropic i phases, the said ferroelectric smectic liquid crystalline ($S_{c^*}$) recording layer (a) containing at least one polymer I having chiral mesogenic side groups exhibiting ferroelectric smectic liquid crystalline behavior and comprising monomer units derived from monomers of the structure I

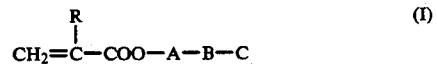

where
is hydrogen, chlorine or methyl,
A is a flexible space-maintaining long-chain molecular moiety having the formula —$(-CH_2-)_R$— where R is an integer from 1 to 30,
is an optically active chiral molecular moiety and B is a mesogenic molecular moiety which consists of three or more aromatic nuclei bonded linearly or virtually linearly to one another and which is selected from the group consisting of
i) moieties B which contain one or more napth-2,6-ylene groups,
ii) moieties B of the formula III

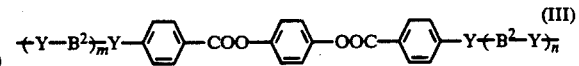

where
B² is a p-phenylene, a biphenyl-4,4'-diyl or a napth-2,6-ylene group
Y is an ether, an ester a thioester group or a carbon-carbon single bond and
m and n are each 0 or an integer ≧1;
iii) moieties b of the formula IV

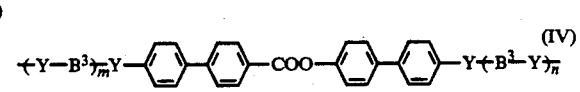

where m and n and Y have the abovementioned meanings and B³ is selected from the group consisting of the p-phenylene, the biphenyl-4-4'-diyl and the napth-2,6-ylene group and the group III-1

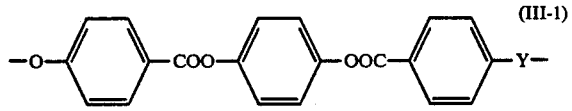

where Y has the abovementioned meanings; and iv) moieties B, selected from the group consisting of the groups X-1 to X-4

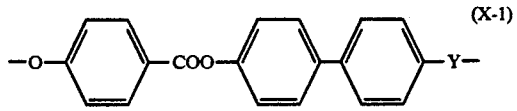

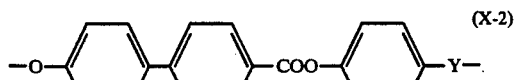

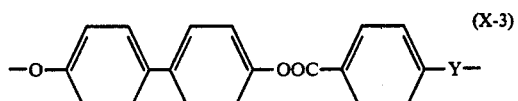

and

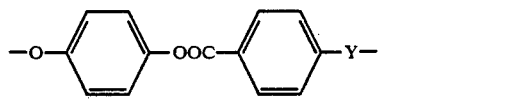

where Y has the abovementioned meanings and the groups X-1 to X-4 are bonded via the ether group to moiety A, with the proviso that the moiety C of the molecule is exclusively selected from the group consisting of the pinan-3-yl, the camphan-2-yl and the p-menthan-3-yl group and the group of the formula VII

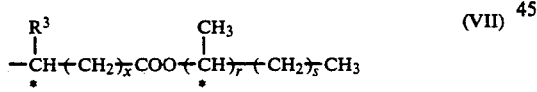

where $R^3$ is methyl or trifluoromethyl, x and r independently of one another are each 0 or 1 and s is an integer from 1 to 3, the group of the formula VIII

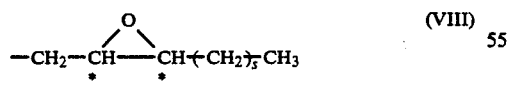

where s has the abovementioned meaning, and the group of the formula IX

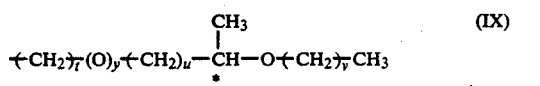

where t, u and v independently of one another are each an integer of from 1 to 10, t and u independently of one another may furthermore be 0, and y is 0 or 1, whenever one of the said groups X-1 to X-4 is selected for moiety B of the molecule, (2) detecting the recorded data or regions with the aid of a read laser beam by means of the birefringence contrast, the dichroic contrast, light scattering at scattering centers and/or interference of reflected laser light waves of different phase velocities, the light reflected by the recording element being analyzed, and then (3) erasing the recorded data or regions completely or sector by sector by heating the entire surface or individual sectors of the recording layer (a) in an external electric field, and (4) repeating process steps (1) and (2).

22. A method as claimed in claim 21, wherein the said moiety B of the molecule which comprises at lest one napth-2,6-ylene group is a group of the structure II

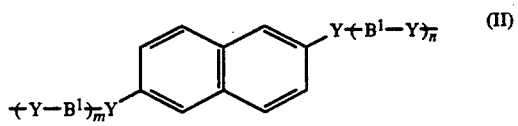

where
$B^1$ is a p-phenylene and/or a biphenyl-4,4'-diyl group, Y is an ether, an ester a thioester group or a carbon-carbon single bond and m and n are each 0 or an integer $\geq 1$, with the proviso that n may not be o when m is o.

23. A method as claimed in claim 22, wherein the said moiety B of the molecule which comprises at least one napth-2,6-ylene group is selected from the groups II-1 to II-3

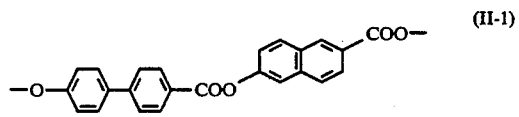

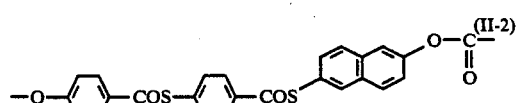

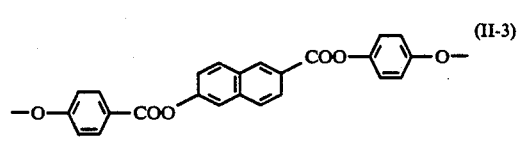

24. A method as claimed in claim 21, wherein the group III-1

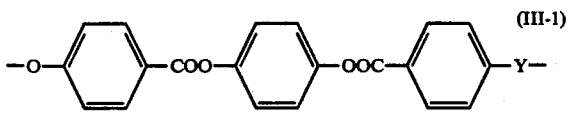

where Y has the abovementioned meanings, is used as the said moiety B of the structure III.

25. A method as claimed in claim 21, wherein the group IV-1

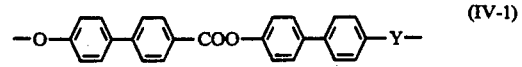

where Y has the abovementioned meanings, is used as the said moiety B of the structure IV.

26. A method as claimed in claim 23, wherein the group II-1 to II-3 is bonded to the said moiety A of the molecule via the ether group.

27. A method as claimed in claim 24, wherein the group III-1 is bonded to the said moiety A of the molecule via the ether group.

28. A method as claimed in claim 25, wherein the group IV-1 is bonded to the said moiety A of the molecule via the ether group.

29. A method as claimed in claim 21, wherein the molecular moiety C is a group of the formula VI

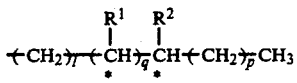  (VI)

where
$R^1$ is halogen,
$R^2$ is methyl, cyano or halogen,
l is 0 or an integer of from 1 to 10,
q is 0 or 1 and
p is 0 or an integer of from 1 to 10, with the proviso that p may not be 0 when $R^2$ is methyl.

30. A method as claimed in claim 21, wherein the molecular moiety C is a pinan-3-yl, camphan-2-yl or p-methan-3-yl group.

31. A method as claimed in claim 21, wherein the molecular moiety C is a group of the formula VII

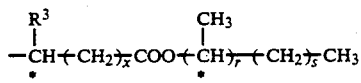  (VII)

where $R^3$ is methyl or trifluoromethyl, r and x independently of one another are each 0 or 1 and s is an integer of from 1 to 3.

32. A method as claimed in claim 21, wherein the molecular moiety C is a group of the formula VIII

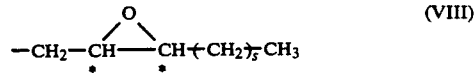  (VIII)

where s has the abovementioned meanings.

33. A method as claimed in claim 21, wherein the molecular moiety C is a group of the formula IX

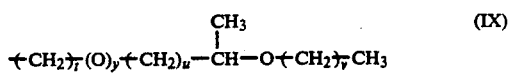  (IX)

where t, u and v independently of one another are each an integer of from 1 to 10, t and u independently of one another may furthermore be 0, and y is 0 or 1.

34. A method as claimed in claim 21, wherein the said polymer I additionally containing pendant side groups exhibiting liquid crystalline behavior.

35. A method as claimed in claim 21, wherein the said polymer I further comprises pendant side groups containing chromophores.

36. A method as claimed in claim 34, wherein the said polymer I further comprises pendant side groups containing chromophores.

37. A method as claimed in claim 21, wherein the said laser laser-optical recording element is in the form of a laser-optical data disk.

38. A method as claimed in claim 21, wherein the thickness d of the said recording layer (a) is from 0.1 to 5 μm.

39. The method as claimed in claim 21, wherein the recording element exhibits a response time $\tau$ required for switching the recording layer (a) from one ferroelectric smectic liquid crystalline $S_C*$ order state to the other, and such response time is less than 1 ms at above room temperature.

40. A method as claimed in claim 39, wherein the response time $\tau$ at a temperature which is 1° C. below the phase transition $S_C* \rightarrow S_A*$ is less than 100 μs.

* * * * *

UNITED STATES PATENT AND TRADEMARK OFFICE
CERTIFICATE OF CORRECTION

PATENT NO.  : 5,212,027
DATED       : May 18, 1993
INVENTOR(S) : Etzbach, et. al.

It is certified that error appears in the above-indentified patent and that said Letters Patent is hereby corrected as shown below:

Column 74, line 47, "formula II" should read --formula III--.

Column 78, line 34, "R" should be in front of "is hydrogen, chlorine or methyl, ";

Column 78, line 38, "C" should be in front of "is an optically active chiral...".

Column 79, line 30, delete the formula--.

Column 80, line 29, "$\underline{2}$" should be --$\underline{7}$--.

Signed and Sealed this

Twenty-first Day of December, 1993

Attest:

BRUCE LEHMAN

Attesting Officer        Commissioner of Patents and Trademarks